(12) United States Patent
Weeks et al.

(10) Patent No.: US 7,619,861 B2
(45) Date of Patent: Nov. 17, 2009

(54) PROTECTIVE DEVICE HAVING A THIN CONSTRUCTION

(75) Inventors: Richard Weeks, Little York, NY (US); Kent R. Morgan, Groton, NY (US); Jeffrey C. Richards, Baldwinsville, NY (US); David A. Finlay, Sr., Marietta, NY (US); Gerald R. Savicki, Jr., Canastota, NY (US); Bruce F. Macbeth, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 12/415,217

(22) Filed: Mar. 31, 2009

(65) Prior Publication Data

US 2009/0184787 A1    Jul. 23, 2009

Related U.S. Application Data

(63) Continuation of application No. 10/953,805, filed on Sep. 29, 2004, now abandoned.

(51) Int. Cl.
*H02H 3/00* (2006.01)

(52) U.S. Cl. .......................................... 361/42; 335/18
(58) Field of Classification Search ..................... 335/6, 335/18; 361/42–50
See application file for complete search history.

(56) References Cited

U.S. PATENT DOCUMENTS 5,594,398 A * 1/1997 Marcou et al. ................ 335/18
5,661,623 A * 8/1997 McDonald et al. ............ 361/42

\* cited by examiner

*Primary Examiner*—Ramon M Barrera
(74) *Attorney, Agent, or Firm*—Daniel P. Malley; Bond, Schoeneck & King, PLLC

(57) ABSTRACT

The present invention is directed to a wiring device that includes a front cover assembly. The front cover assembly includes a front cover having at least one plug receptacle opening disposed therein. A ground strap is coupled to the cover assembly. A device assembly includes a plurality of line terminals configured to be connected to an AC power source, a plurality of load terminals configured to be connected to a downstream load, and at least one set of receptacle load terminals in communication with the at least one receptacle opening. The device assembly also includes a fault response circuit coupled to the plurality of line terminals. A back cover is coupled to the front cover assembly to accommodate the device assembly therein. The ground strap element is disposed between the front cover assembly and the back cover. The back cover extending beyond the ground strap a distance substantially less than or equal to one inch.

33 Claims, 14 Drawing Sheets

PROTECTIVE DEVICE HAVING A THIN CONSTRUCTION

CROSS-REFERENCE TO RELATED APPLICATIONS

This is a continuation of U.S. patent application Ser. No. 10/953,805 filed on Sep. 29, 2004, the content of which is relied upon and incorporated herein by reference in its entirety, and the benefit of priority under 35 U.S.C. § 120 is hereby claimed.

BACKGROUND OF THE INVENTION

1. Field of the Invention

This invention relates to the field of circuit protective devices, and in particular, to a circuit protection device having a relatively thin construction.

2. Technical Background

The demand for electrical power is insatiable because of the increased reliance on electricity for everyday needs. Power is provided to electricity users by way of electrical distribution systems that typically include electrical wiring from a utility power source to a breaker panel disposed in a house, building or some other facility. The breaker panel distributes AC power to one or more branch electric circuits installed in the structure. The electric circuits may typically include one or more receptacle outlets and may further transmit AC power to one or more electrically powered devices, commonly referred to in the art as load circuits. The receptacle outlets provide power to user-accessible loads that include a power cord and plug, the plug being insertable into the receptacle outlet. However, certain types of faults have been known to occur in electrical wiring systems. Accordingly, each electric circuit typically employs one or more electric circuit protection devices.

Both receptacle devices and electric circuit protective devices are disposed in an electrically non-conductive housing. The housing also includes electrical terminals that are electrically insulated from each other. The terminals provide a means for connecting the device to the source of AC power and a means for connecting the device to a load. In particular, line terminals couple the device to the source of AC electrical power, whereas load terminals couple power to the load. Of course, those of ordinary skill in the art will understand that the term "load" may refer to an appliance, a switch, or some other device. Load terminals may also be referred to as "feed-through" or "downstream" terminals because the wires connected to these terminals may be coupled to a daisy-chained configuration of receptacles or switches. The load may ultimately be connected at the far end of this arrangement. Referring back to the device housing, the load terminals may be connected to an electrically conductive path that is also connected to a set of receptacle contacts. The receptacle contacts are in communication with receptacle openings disposed on the face of the housing. This arrangement allows a user to insert an appliance plug into the receptacle opening to thereby energize the device.

With regard to installation, protective devices are commonly installed in outlets boxes. An outlet box may be located in a wall, ceiling, floor, counter-top, or the like. An electrical cable is placed from the breaker panel to the outlet box to provide the line terminals with AC power. The cable typically includes a plurality of insulated electrical conductors. Cables may be bundled together using a rigid or flexible tube made out of metal and/or electrically non-conductive material. A second cable of similar composition to the first cable is placed between the outlet box and any subsequent devices in the daisy-chain arrangement referred to above. The second cable, of course, is connected to the feed-through terminals. During installation of the outlet box, the cables are fed through openings in the outlet box for connection to their respective terminals, i.e., line or load. After the electrical conductors have been connected, the protective device is inserted into the front opening of the outlet box until the strap and a mounting surface in the outlet box mate.

One of the problems associated with device installation relates to the limited interior volume in an outlet box. When the protective device is inserted into the outlet box, the wires, cables and associated tubing disposed inside the outlet box must necessarily be compressed within the space formed between the back side of the device and the interior wall of the outlet box. This may lead to a number of adverse and undesirable results.

When an installer jams the device and the wires into the outlet box, the insertion force may cause the strap or some other member of the outlet box or protective device to deform. The deformation may interfere with the installation of the plate, or may prevent the protective device from fully coupling to the mounting surface of the outlet box. The deformation may also damage the protective device. As a result, the protective device may not function. Furthermore, the wire insulation may be urged against sharp interior edges of the outlet box or exterior edges of the protective device causing the conductors to become exposed. If the insulation loses its integrity, the electrical conductors may short together, or may short to the outlet box. Compression may also cause the insulation to split if the conductor becomes compressed within a tight bending radius. On the other hand, while any given electrical terminal is configured to grip an electrical conductors with a securing force, the compression may apply an opposing force that results in loss of the intended electrical connection.

The above described adverse effects are dependent on the random motions of the electrical conductors while the protective device is being inserted in the outlet box. The chance occurrence of an adverse effect is aggravated by the fact that the compressed wires cannot be seen by the installer because they are hidden from view as the device is being inserted into the outlet box.

The problems described above are being exacerbated by the changes to wiring and installation practices that have occurred in recent years. The number of outlet box locations that require protection has expanded in the various commercial, institutional and residential sectors. Considering the residential sector, GFCIs were originally required to protect receptacles in the vicinity of outdoor swimming pools and have progressively been required to protect bathrooms, kitchens, basements and outdoor receptacles. More recently, AFCIs have been required to protect bedroom receptacles. The proliferation of installed locations increases the likelihood of such problems occurring.

At the same time, there has been a reduction in the thickness of the wall stud and sheetrock used to construct walls. This has necessitated the use of shallower outlet boxes. Unfortunately, the shallower outlet box provides less volume for the electrical conductors inside the outlet box, causing an increase in the compression forces on the electrical conductors. This development is further exacerbated by the increased use of multiple cables in the outlet box. The additional cables are needed for the redundant line and/or feed-thru terminals often included in the protective device.

In the residential market, the average square footage of new residences has been ever increasing. New residences typically include more built-in appliances than do older homes. As such, an increased amount of electric current must be propagated over larger distances. Accordingly, electrical conductors of greater cross section are required to conduct the greater current over a greater distance. Obviously, the consequence of multiple cables or electrical conductors of greater cross section is an increased probability of a problem occurring during installation.

Another problem occurs when new protective devices are used to replace older non-protective wiring devices in older homes. Note that the electrical conductors may be original to the house. The insulation associated with the original conductors may be weakened through aging. This may result in an older installation being more susceptible to one or more adverse effects described above.

All of the aforementioned trends lead to smaller outlet boxes. Accordingly, a decrease in the size of the protective device would be quite desirable. However, this is problematic because the necessary functionality that modern devices must possess is driver toward larger devices. To illustrate this point, a short survey of modern protective devices is provided below.

As noted above, there are several types of electric circuit protection devices. For example, such devices include ground fault circuit interrupters (GFCIs), ground-fault equipment protectors (GFEPs), and arc fault circuit interrupters (AFCIs). This list includes representative examples and is not meant to be exhaustive. Some devices include both GFCIs and AFCIs. As their names suggest, arc fault circuit interrupters (AFCIs), ground-fault equipment protectors (GFEPs) and ground fault circuit interrupters (GFCIs) perform different functions.

An arc fault is a discharge of electricity between two or more conductors. An arc fault may be caused by damaged insulation on the hot line conductor or neutral line conductor, or on both the hot line conductor and the neutral line conductor. The damaged insulation may cause a low power arc between the two conductors and a fire may result. An arc fault typically manifests itself as a high frequency current signal. Accordingly, an AFCI may be configured to detect various high frequency signals and de-energize the electrical circuit in response thereto.

Ground fault circuit equipment protectors (GFEPs) and ground fault circuit interrupters (GFCIs), on the other hand, are used to detect ground faults. A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. Ground faults, as well as arc faults, may also result in fire. GFCIs intended to prevent fire have been called ground-fault equipment protectors (GFEPs).

In addition to detecting arc faults and/or ground faults, a protective device itself must be protected from transient voltages and other surge phenomena. Transient voltages may be generated in a number of ways. For example, transient voltages may be generated by lightning storms. Transient voltages may also be produced when an inductive load coupled to the electrical distribution system is turned off, or by a motor coupled to the electrical distribution system that includes commutators and brushes. Whatever the cause, transient voltages are known to damage a protective device/cause an end of life condition. The damage may result in the protective device permanently denying power to the protected portion of the electric circuit. Consequently, the user suffers an expense and inconvenience of having to replace the protection device. Alternatively, the damage may result in the protection device becoming non-protective while continuing to provide power to the load circuit. The user can decide to keep using the device even though protection is not being afforded. Thus, damage of either type is not desirable. Accordingly, transient voltage tests are included in Underwriters Laboratories requirements for protective devices (e.g., UL standard 943 for GFCIs and UL standard 1699 for AFCIs). The protection device must continue to operate following these tests.

To meet the UL requirements, metal oxide varistors (MOVs) are typically employed. MOVs clamp the transient voltage imposed on the line (or load) terminals of the protection device to a safe voltage, i.e., a magnitude of typically not more than twice the phase voltage. One drawback to using MOVs relates to the fact that they are bulky and expensive. UL has recently promulgated new surge voltage requirements for GFCIs and AFCIs that test the protective device's ability to provide protection following exposure to harsher surge energy levels. The new requirement is typically met by including a larger MOV which is adept at absorbing the higher energy voltage impulses. The protective device may include other surge protection components. In addition to MOVs, other surge protective components such as transient voltage surge suppressors (TVSS), spark gaps, and other such devices may be used. These components are not meant to be an exhaustive list.

Of course, the circuitry used to implement a GFCI or an AFCI may typically include a sensor, such as a transformer, a solenoid, an SCR device, and other components disposed on a printed circuit board. The AFCI is a more recent protective device technology, similar to GFCI technology but typically having a detector that includes a greater number of electronic components that occupy more space. Those skilled in the art will recognize that there are different types of arc fault conditions, exemplified by a number of UL test conditions. There is a desire for a single protective device that passes as many of the arc fault test requirements as possible. There is also an increasing interest in combining two or more of a GFCI, TVSS, and AFCI in the protective device.

For these and other like reasons, there has been an increase in the volume of the protective device's housing in order to meet new requirements. On the other hand, because of all of the trends discussed above, including the decrease in size of wall studs and wall board, the size of the outlet box has decreased as well. Unfortunately, the available volume inside the outlet box for the electrical wiring is reduced accordingly. This reduction in available volume results in greater susceptibility to one or more of the installation problems described above.

What is needed is a smaller protective device that provides all of the protective safety features currently provided by larger devices. It is further desirable to provide a protective device having a width behind the strap of less than one inch.

SUMMARY OF THE INVENTION

The present invention addresses all of the needs articulated above by engineering both the interior components and the arrangement of interior components to provide a smaller protective device that provides all of the protective safety features currently provided by larger devices. In fact, substantially all of the protective circuit assembly may be disposed in approximately one-half of the device such that the remaining half of the device interior may be employed by other additional functions.

One aspect of the present invention is directed to a protective wiring device that includes a housing having a front cover member including a front major surface and a back cover member including a back major surface substantially in parallel with the front major surface. The housing further includes an electrically isolating member disposed between the front cover member and the back cover member such that a front interior region is formed between the front cover member and the electrically isolating member and a rear interior region is formed between the back cover member and the electrically isolating member. A ground strap has an interior ground strap portion disposed on the electrically isolating member in the front interior region. A plurality of line terminals are configured to be connected to an AC power source and a plurality of load terminals. The plurality of line terminals include a hot line contact and a neutral line contact and the plurality of load terminals include a hot load contact and a neutral load contact. The hot line contact and the neutral line contact are configured to be coupled to the hot load contact and the neutral load contact, respectively, in a reset state and decoupled in a tripped state. A user accessible reset button assembly is disposed in the front cover and configured to effect the reset state in response to a user stimulus. The user accessible reset button assembly establishes a plane normal to the major front surface and subdivides the rear interior region into a first rear interior region portion and a second rear interior region portion. A protective electrical assembly is substantially disposed in the rear interior region. The protective electrical assembly includes a toroidal sensor assembly disposed in the first rear interior region portion and coupled to the plurality of line terminals. The toroidal sensor assembly is coupled to a fault detection circuit. The fault detection circuit is coupled to a solenoid assembly disposed proximate the toroidal sensor assembly and disposed in the first rear interior region portion such that a vertical distance between the interior ground strap portion and the back major surface is substantially less than or equal to one inch.

In another aspect, the present invention is directed to a wiring device for use in an electrical distribution system. The device is characterized by a central longitudinal axis defining a length of the device, a central latitudinal axis defining a width of the device, and a central vertical axis defining a thickness of the device. Each of the central longitudinal axis, the central latitudinal axis and the central vertical axis are disposed orthogonally relative to the other axes and substantially defining a device center. The device comprises a housing that includes a front cover having a front major surface and back cover having a rear major surface substantially parallel to the front major surface. The front cover has at least one set of receptacle openings disposed therein. The back cover includes a back cover interior region having a first interior portion substantially disposed on a first side of the central latitudinal axis and a second interior portion substantially disposed on a second side of the central latitudinal axis. A plurality of line terminals are configured to be connected to an AC power source and a plurality of load terminals are included as well. The plurality of line terminals are accessible via the back cover. A ground strap is disposed on an electrically isolating member situated between the front cover and the back cover. The ground strap includes an interior ground strap portion disposed in parallel with the central longitudinal axis, a vertical distance between the interior ground strap portion and the back major surface being substantially less than or equal to one inch. A hot receptacle terminal structure includes at least one hot female receptacle contact and a hot receptacle terminal contact. A neutral receptacle terminal structure includes at least one neutral female receptacle contact and a neutral receptacle terminal contact. The hot receptacle terminal structure and the neutral receptacle terminal structure are disposed on the electrically isolating member. A protective electrical assembly is substantially disposed in the back cover interior region. The protective electrical assembly includes a sensor assembly coupled to the plurality of line terminals and disposed in the first interior portion. The sensor assembly is characterized by a longitudinal sensor axis arranged substantially in parallel with the central longitudinal sensor axis. The sensor assembly is configured to provide a sensing signal corresponding to AC current propagating in the electrical distribution system. A fault detection circuit is coupled to the sensor assembly. The fault detection circuit is configured to generate a fault detection signal based on the sensing signal. A solenoid assembly is disposed proximate the sensor assembly in the first interior portion and coupled to the fault detection circuit. The solenoid assembly is characterized by a longitudinal solenoid axis arranged substantially in parallel with the central longitudinal sensor axis. The solenoid is energized in response to the fault detection signal. A circuit interrupter is configured to couple a line hot contact, a load hot contact and the hot receptacle terminal contact, and couple a neutral line contact, a neutral load contact and the receptacle neutral terminal contact in a reset state such that the plurality of line terminals are coupled to the plurality of load terminals. The circuit interrupter is also configured to trip in response to the solenoid assembly being energized such that the plurality of line terminals and at least a portion of the plurality of load terminals are decoupled in a tripped state.

In yet another aspect, the present invention is directed to a wiring device for use in an electrical distribution system. The device is characterized by a central longitudinal axis defining a length of the device, a central latitudinal axis defining a width of the device, and a central vertical axis defining a thickness of the device. Each of the central longitudinal axis, the central latitudinal axis and the central vertical axis are disposed orthogonally relative to the other axes and substantially defining a device center. The device comprises a back cover member including an back cover interior region and an exterior major back surface. The back cover interior region includes a first interior half-portion substantially disposed on a first side of the central latitudinal axis and a second interior half-portion substantially disposed on a second side of the central latitudinal axis. The back cover interior region further includes a hot longitudinal interior portion disposed on a first side of the central longitudinal axis and a neutral longitudinal interior portion disposed on a second side of the central longitudinal axis. A plurality of line terminals are disposed in the first interior half-portion and configured to be connected to an AC power source; a plurality of load terminals are disposed in the second interior half-portion. The plurality of line terminals are connected to their respective plurality of load terminals in a reset state and disconnected in a tripped state. A protective electrical assembly is substantially disposed in the back cover interior region. The protective electrical assembly includes a toroidal sensor assembly disposed in the first interior half-portion and is coupled to the plurality of line terminals. The toroidal sensor assembly is characterized by a longitudinal toroid axis arranged substantially in parallel with the central longitudinal axis. The toroidal sensor assembly is coupled to a fault detection circuit. The fault detection circuit is coupled to a solenoid assembly disposed proximate the toroidal sensor assembly in the first interior half-portion. The solenoid assembly is characterized by a longitudinal solenoid axis arranged substantially in parallel with the longitudinal toroid axis but vertically offset therefrom. The solenoid assembly is coupled to a hot cantilevered circuit interrupter structure disposed in the hot longitudinal interior portion adjacent the solenoid assembly and a neutral cantilevered circuit interrupter structure disposed in the neutral longitudinal interior portion adjacent the solenoid assembly. The hot cantilevered circuit interrupter structure and the neutral cantilevered circuit interrupter structure are configured to move between the reset state and the tripped state. A non-conductive separator is coupled to the back cover member. The non-conductive separator substantially encloses the protective electrical assembly within the back cover member. The non-conductive separator includes a central portion abutting an upper portion of the solenoid assembly. The non-conductive separator further includes a first electrically insulated compartment formed in a portion thereof. The first electrically insulated compartment extends into the first interior half-portion such that a first compartment sidewall is substantially adjacent a side portion of the toroidal sensor assembly and configured to accommodate a ground prong from an electrical plug connector. A ground strap is disposed in the central portion of the separator. A vertical distance between a central portion of the ground strap and the back major surface is substantially less than or equal to one inch. A front cover assembly is coupled to the separator and substantially enclosing the central portion of the ground strap therein. The front cover assembly includes a front cover having at least one plug receptacle disposed therein. The at least one plug receptacle includes a first ground prong opening in spatial communication with the first electrically insulated compartment.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
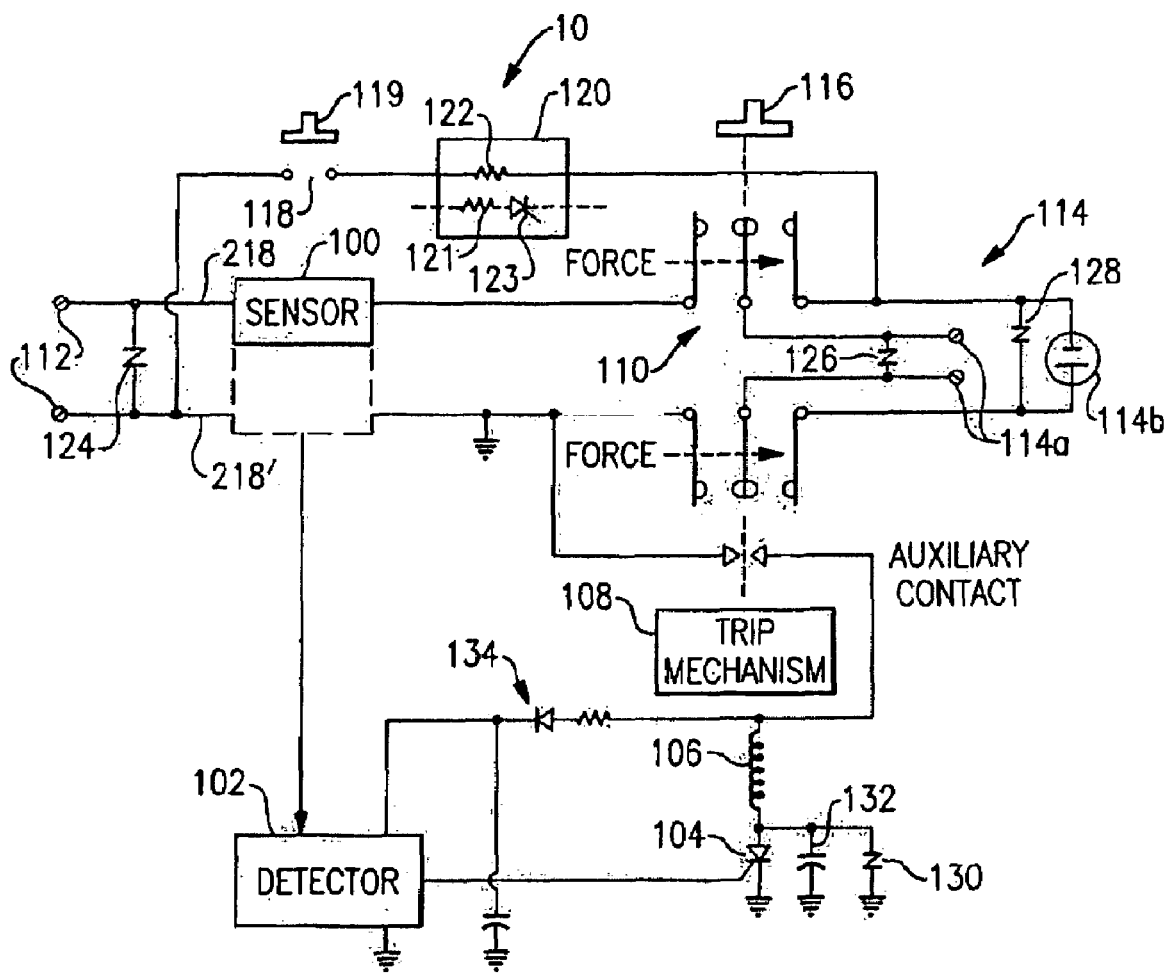
FIG. 1 is a circuit diagram of a thin electrical wiring device in accordance with a first embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective wiring device of the present invention is shown in FIG. 1, and is designated generally throughout by reference numeral 10.

As embodied herein, and depicted in FIG. 1, a circuit diagram of a thin electrical wiring device 10 in accordance with a first embodiment of the present invention is disclosed. Before providing a detailed description of each component, it is noted that device 10 is comprised generally of a conductive path (between the line and the load), a fault response function, and a test capability.

With regard to the conductive path between the line terminals 112 and the load terminals 114, device 10 is properly connected to an AC power source by way of line terminals 112. A phase conductive path 218 and a neutral conductive path 218' extend from the line terminals 112 to interrupting contact assembly 110. Movistor 124 is also coupled between the phase conductor 218 and the neutral conductor 218'. Sensor assembly 100, as indicated by the dashed lines, may be coupled to the phase conductor 218, the neutral conductor 218', or both, depending on the sensor functionality. These elements will be discussed in detail below. When the contacts 110 are closed, AC power propagates along the phase conductor 218 to a load connected to the load terminals 114. The return current from the load(s) propagates along neutral conductive path 218'. Load terminals 114 include feed through terminals 114a and/or plug receptacle terminals 114b. Thus when a true fault condition is sensed and detected, the circuit interrupter trips to terminate the current flowing through the fault. The state of the interrupting contacts 110, i.e. open or closed, depends on the fault response circuitry. Reset button 116 is coupled to trip mechanism 108. Reset button 116 enables circuit interrupter 110 to be closed (reset) after the fault condition has been removed, whereupon load terminals 114 and line terminals 112 are re-connected.

In order to safe-guard the protection device 10 from voltage transients that occur on the electrical power distribution system, a metal oxide varistor may be included, such as MOV 124 across line terminals 112, MOV 126 across load terminals 114a, or MOV 128 across load terminals 114b. Alternatively, surge protective devices can be included to safe-guard the protection device from voltage transients.

Sensor assembly 100 is configured to sense at least one fault condition in the electrical distribution system. In other words, device 10 may include a GFCI, GFEP, AFCI, and/or a TVSS. Accordingly, sensor assembly 100 may include one or more sensors, depending on the functionality of device 10. Sensor 100 is coupled to detector 102. The output of the fault detector 102 is connected to a switch (SCR) 104. SCR 104 is configured to energize solenoid 106 when signaled by detector 102. When solenoid 106 is energized, trip mechanism 108 opens the interrupting contacts 110. Interrupting contacts 110 may be closed by actuating reset button 116.

In addition, device 10 includes test circuit 120. Test circuit 120 is coupled to the hot line conductor 218, neutral load conductor 218', or both. Test circuit 120 includes test switch 118, which is actuated by a user to start the test cycle. Now that a high level description of device 10 has been provided, an explanation of some of the circuit components is provided in greater detail.

If device 10 includes GFCI protection, sensor assembly 100 includes a sensor that is configured to sense the net differential current flowing in the hot conductive path and the neutral conductive path of the electrical distribution system. Under normal operating conditions, the net current in the load conductors is zero when device 10 provides power to a load. The current to the load and from the load are equal and opposite.

As the name suggests, a ground fault occurs when a phase conductor becomes grounded. Some of the current flows to ground instead of returning back through sensor assembly 100. Obviously, when current is siphoned off in this manner, the net current flowing through sensor 100 is not zero. Sensor assembly 100 senses the magnitude of the differential ground fault current.

Those of ordinary skill in the art will understand that the GFCI sensor disposed in assembly 100 typically includes a toroidally shaped differential transformer. A GFCI sensor assembly may also be configured to detect grounded neutral conditions. Thus, a GFCI equipped in this manner will typically includes a neutral (grounded neutral) transformer. When a grounded neutral condition is present, the neutral transformer provides the differential transformer with a differential signal to signal the occurrence of a grounded neutral condition.

If device 10 includes AFCI protection, sensor assembly 100 includes a different type of sensor that is configured to sense high frequency disturbances superimposed on the power line frequency. These high frequency disturbances are indicative of an arcing condition. These disturbances may occur in either the load current, the line voltage or both. In one approach, sensor assembly 100 may include a toroidally shaped current transformer for sensing load current, and/or a voltage divider for sensing line voltage.

As noted above, sensor assembly 100 provides detector 102 with a sensor fault signal. Detector 102 determines if the characteristics of the fault signal are indicative of a true fault condition. Detector 102 is connected to silicon controlled rectifier (SCR) 104. When a true fault condition is detected, detector 102 turns SCR 104 ON. In turn, SCR 104 activates trip solenoid 106 which releases trip mechanism 108. When trip mechanism 108 is released, circuit interrupter contacts 110 are opened. As noted previously, circuit interrupter 110 is disposed between the line terminals 112 and the load terminals 114 of device 10. While device 10 may be configured to respond to the various types of fault conditions by interrupting power, device 10 may also provide an indicator element that indicates the presence of a fault condition. The indicator can be a visual indicator or an audible indicator. The output from the indicator may be steady or intermittent.

Referring back to test circuit 120 in FIG. 1, device 10 includes a test switch 118. Test switch 118 may be operated by the user by depressing a test button 119. In another embodiment test switch 118 may be coupled to reset button 116. In this case, the test switch 118 is actuated by depressing the reset button 116. Referring back to the embodiment shown in FIG. 1, when test switch 118 is closed, test circuit 120 is configured to simulate a true fault condition across line terminals 112. Test circuit 120, as shown in FIG. 1, is stylized to show both a GFCI test circuit and an AFCI test circuit. For example, the GFCI test circuit 120 may include resistor 122. The current through resistor 122 produces a simulated ground fault condition. Alternatively, a test provision may be included that manually or automatically assesses whether the protection device has reached end-of-life. The test provision may be configured to deny reset, to indicate, or to indicate in advance of denying reset, when an end-of-life condition has been detected.

The AFCI test circuit 120 may alternatively include a resistance 121 in series with a solid state switch 123. Switch 123 is configured to open and close to produce an intermittent current through the resistance to thereby simulate an arc fault condition.

Figure 2:
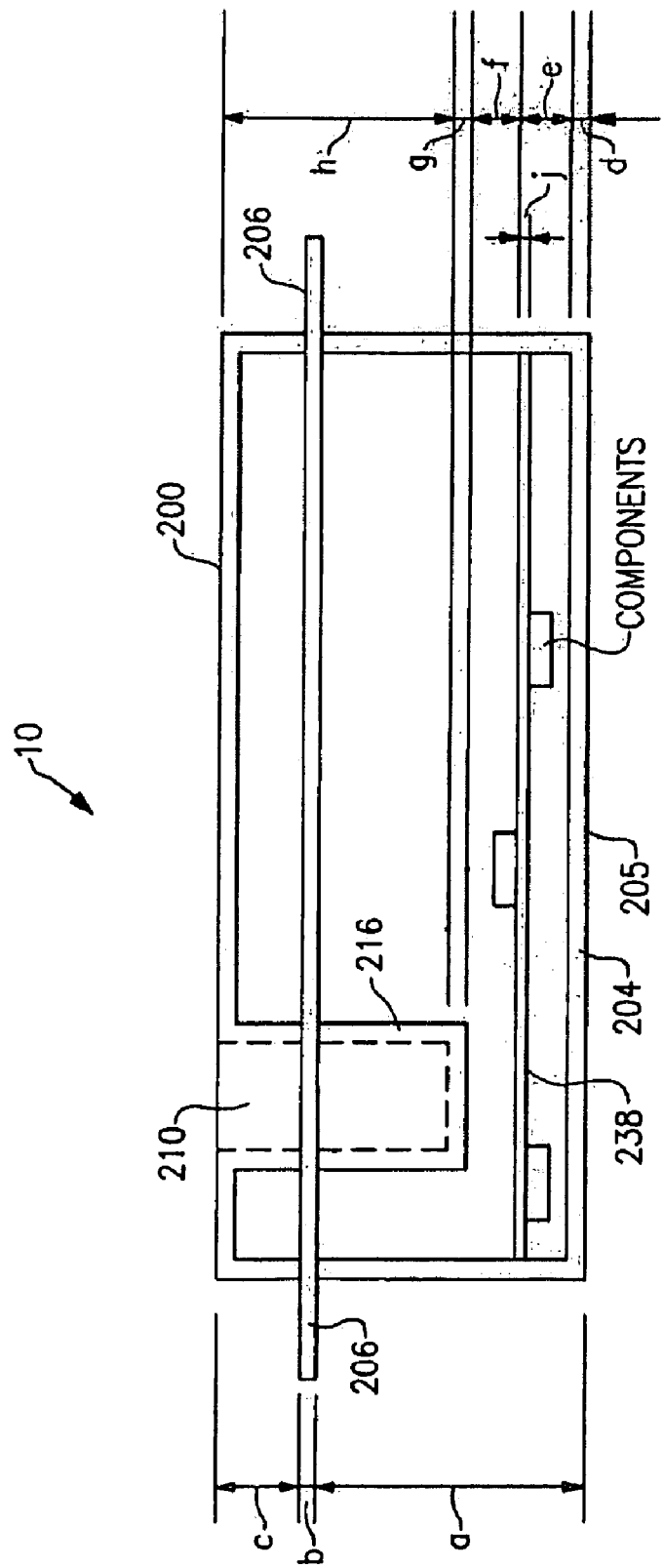
FIG. 2 is a cross-sectional view of a thin electrical device in accordance with the present invention.

As embodied herein and depicted in FIG. 2, a cross-sectional view of a thin electrical device 10 in accordance with the present invention is disclosed. A maximum depth (a) of about 1.0 inch behind the strap 206 may be achieved using one or more of the techniques described herein. In FIG. 2, a maximum depth above the strap (c) is approximately 0.300 inches, with a strap thickness (b) of about 0.05 inches. In achieving this, the various components and features of device 10 are typically as follows. The depth (h) of ground opening 210 is typically about 0.86 inches. The wall thickness (g) of compartment 216 is typically about 0.035 inches. The depth of compartment 216 is depth (h) plus the wall thickness (g), e.g., 0.895 inches. The back cover wall thickness (d) is approximately 0.065 inches. The printed circuit board is disposed inside back cover 204 to lie on a plane substantially parallel to surface 205. The printed circuit board is spaced a dimension (e) from the back cover by 0.100 inches to accommodate components disposed on the printed circuit board. The printed circuit board has a thickness (j) of about 0.031 inches. Accordingly, the maximum height (f) of a component disposed between the ground blade compartment and the printed circuit board becomes 0.26 inches. Components, including electro-mechanical components, whose height is greater than about 0.26 inches (thick components) are disposed elsewhere within the housing of device 10. In another embodiment, printed circuit board 238 includes an aperture disposed therein to accommodate the ground blade. As such, the depth behind the strap dimension may further be reduced. To those skilled in the art, such dimensions can be adjusted in mix and match combinations so long as the preferred depth dimensions are not violated.

Figure 3:
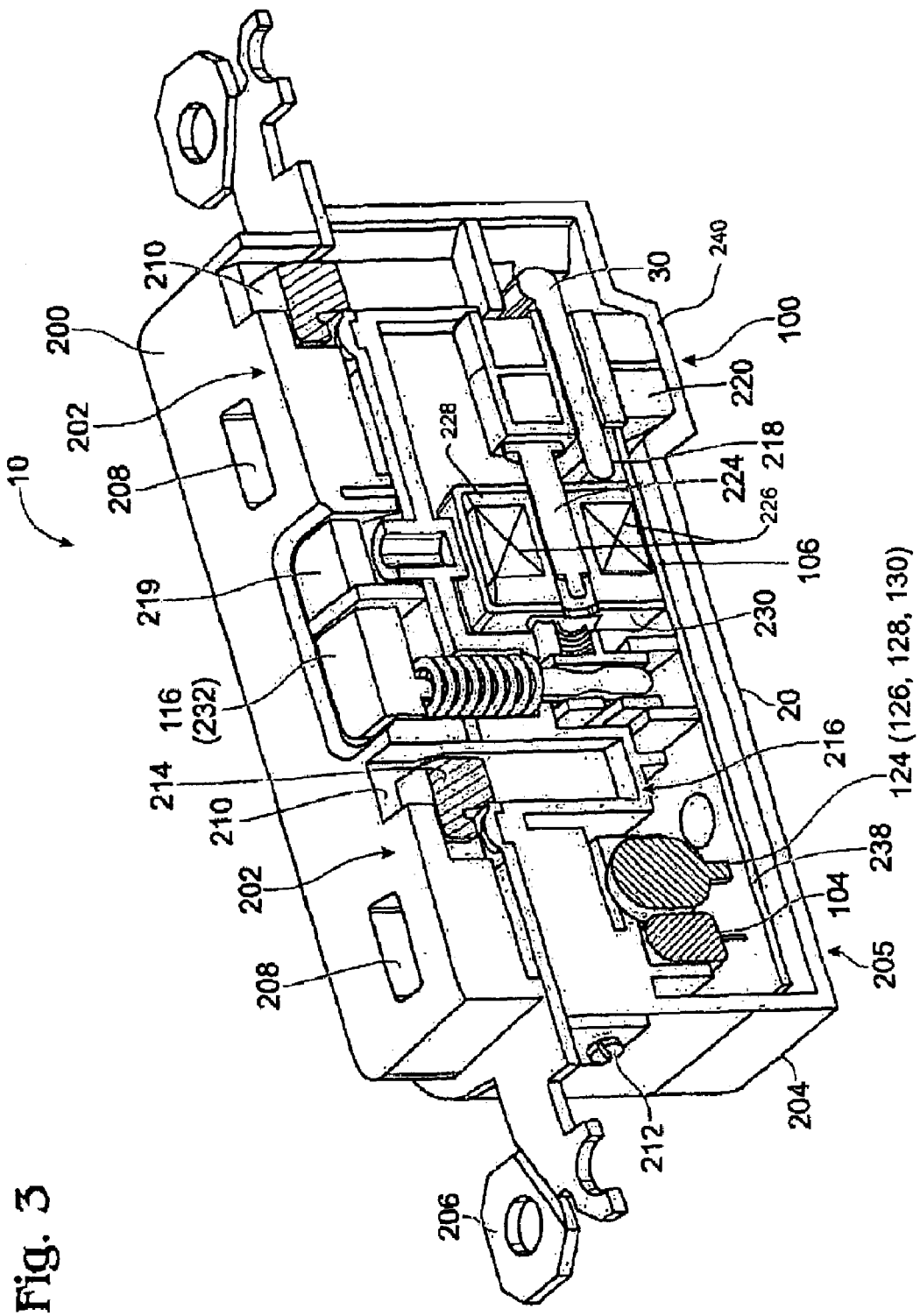
FIG. 3 is a longitudinal cross sectional view of a thin electrical wiring device in accordance with another embodiment of the present invention.

Referring to FIG. 3, a longitudinal cross-sectional view of the thin protective device 10 shown in FIG. 1 is depicted. Device 10 includes a cover assembly 200 in which one or more plug receptacles 202 are disposed. A back cover 204 having a rear surface 205 mates with front cover 200. Strap 206 provides a means for attaching device 10 to an outlet box (not shown). A grounding terminal 212 is disposed under strap 206. The distance from the back of strap 206 and surface 205 is approximately (1) one-inch or less. It is in this sense that device 10 employs thin construction. Device 10 of the present invention facilitates outlet box installation because the thin construction alleviates the issues described in the Background Section of the Invention. In another embodiment, strap 206 may be configured to conform to the shape of the front cover 200 to facilitate placement of interior components.

Each plug receptacle 202 includes at least two load terminal openings 208 to permit electrical interconnection between plug blades and corresponding load terminals 114b. A ground terminal opening 210 may also be provided to accommodate a plug having a ground blade. Opening 210 includes a ground contact 214 disposed therein. As alluded to above, when the plug is inserted into the openings, electrical continuity is established between receptacle load terminals 114b and the plug blades, and between the ground blade and ground contact 214. The plug blades, of course, are connected to a power cord attached to an electrical appliance. Ground contact 214 is connected to grounding terminal 212 by an internal conductive path (not shown).

With regard to thin construction, one limit to depth reduction relates to the length of the ground blade. For 120V/240V electrical distribution systems, for example, opening 210 must extend into device 10 approximately 0.860 inches to accommodate the ground plug blade. Opening 210 may lead to a region of free space within device 10, or to an insulated compartment 216. Compartment 216 is configured to electrically isolate the ground blade from other conductive surfaces included in device 10. In one embodiment, the present invention is implemented by not disposing any components in the space between the bottom of compartment 216 and the interior surface of the back cover 204. In another embodiment, smaller components may be disposed in this space, but cannot have a thickness greater than 0.260 inches if the overall depth behind the strap is approximately one (1) inch or less.

In most wiring devices, the toroidal transformer is a relatively thick component. In the present invention, the thickness of toroidal transformers 100 must be addressed to thereby minimize the overall depth of the device behind the strap. Toroidal transformer 100 is disposed proximate to conductors 218, 218'. Conductors 218, 218' couple line terminals 112 to the load terminals 114. Conductors 218, 218' must be sized to conduct the expected load current without overheating. The load current may typically be about 20 Amperes.

In particular, fault sensing functionality is implemented by passing one or more of the line conductors 218, 218' through the aperture of transformer(s) 100. Line conductors 218, 218' propagate the differential current signals sensed by the transformer(s) 100. Transformers 100 include magnetic core(s) 220 and corresponding multiple turn winding(s) 222 surrounding the core. Current signals induce flux in the magnetic core that, in turn, produce a signal in the winding. Winding(s) 222 are coupled to detector 102 (See FIG. 1). The material and shape of core(s) 220 are configured such that the signal in winding(s) 222 is detectable by detector 102. Furthermore, winding(s) 222 need to be electrically isolated from conductors 218, 218'. The two conductors and the winding(s) are separated by air spaces and/or insulating barriers. Consequently, a toroidal transformer is typically a relatively thick component. A differential transformer, for example, and conductor include these typical dimensions:

| | |
|---|---|
| Conductor diameter | 0.04 inches |
| Transformer inside diameter | 0.240 inches |
| Transformer outside diameter | 0.590 inches |
| Transformer thickness | 0.170 inches |

In an alternate embodiment, back cover 204 includes a protrusion 240 for accommodating a portion of sensor assembly 100. Thus, in one embodiment, back cover 204 includes a major surface area 205 that is substantially parallel with the front face of cover 200. However, back cover 204 also includes a protrusion 240 that extends from surface 205. In one embodiment, protrusion 240 has a surface area that is approximately 0.400 square inches or less. The height of protrusion 240 is approximately 0.150 inches or less. Stated generally, a protrusion is an extension from surface 205 that permits the inclusion of various alternate components within the device. For example, protrusion 240 may be configured to accommodate large sized movistors.

Because the MOV is another example of a relatively thick component, another depth reduction strategy relates to reducing the thickness of the MOV. A MOV that is located across-the-line, such as MOV 124, 126, or 128, is typically greater than 0.650 inches in diameter and 0.250 inches in thickness. The size of the MOV is proportional to its energy absorption capabilities. Thus, larger MOVs tend to do a better job of limiting the amplitude of voltage transients. In particular, MOVs are typically selected to limit the amplitude of the voltage transient to less than about three times the amplitude of the power source voltage to ensure that the protection device survives momentary voltage transients of this amplitude. Accordingly, one size reduction strategy relates to reducing the size of the MOVs while retaining the transient protection capabilities.

Therefore, in one embodiment, the across-the-line MOVs are omitted. MOV 130 (FIG. 1, 2) is disposed in series with an impedance device configured to absorb a major portion of energy during a surge event. However, the circuitry that is most vulnerable to voltage transients is protected by MOV 130. The protected circuitry includes power supply 134 and detector 102. The impedance device may be solenoid 106 (FIG. 1). The impedance of solenoid 106 is frequency dependent, and is typically greater than 50 Ohms in response to high frequency signals such as voltage transients. Most of the energy from the voltage transient is substantially absorbed by solenoid 106 because the impedance of the solenoid is at least an order of magnitude greater than the impedance of MOV 130 at the voltage transient frequencies. MOV 130 absorbs the remainder of the transient energy. An appropriately sized MOV 130 may be less than or equal to 0.354 inches in diameter and 0.250 inches in thickness.

In an alternative embodiment, MOV 130 may be replaced by capacitor 132 or by a similar transient voltage absorbing element. In yet another alternative embodiment, spark gaps may be included as a means for reducing MOV size or for replacing MOVs altogether. Spark gaps may be employed in combination with capacitors or other size-efficient components.

Solenoid 106 is another relatively "thick" component. Of course, solenoid 106 is configured to activate trip mechanism 108 (FIG. 1). Trip mechanism 108 includes an armature 224 that moves in response to a magnetic field produced by current flowing through solenoid 106 when SCR 104 turns ON. Trip mechanism 108 is configured to release (open) circuit interrupter 110 when armature 224 moves. Solenoid 106 includes multiple turns of wire 226 wound on a tubular portion of frame assembly 228 to form a bobbin. Armature 224 is slidably disposed within the tubular portion of frame assembly 228. Frame assembly 228 may include a magnetic bracket 230 configured to increase the magnetic force applied to armature 224. Typical dimensions associated with solenoid 106 are as follows:

| | |
|---|---|
| Armature outside diameter | 0.125 inches |
| Bobbin outside diameter | 0.600 inches |
| Bobbin length | 0.240 inches |
| Bracket assembly height | 0.660 inches |
| Bracket assembly width | 0.350 inches |

Electronic components may be included in the list of relatively thick components. SCR 104, for example, is typically housed in what is known as a TO-92 package whose height (including lead length provision) is typically 0.261 inches.

Thus, thick components include one or more of a sensor 100, SCR 104, solenoid 106, and/or MOV 124. Components that are not thick components, such as conductor 218, may be located between the bottom of opening 210 and the interior surface of back cover 204.

The present invention may also employ surface mount (SM) circuitry because SM circuits are relatively compact and are spatially efficient. Further, multiple circuits may be combined in a single integrated by way of hybrid device technology, ASIC technology, or monolithic integrated circuit technology. For example, miswire protection circuitry and end-of-life circuits may be disposed in such devices. Miswire protection protects the user from a miswired condition wherein AC power is connected to the feed-through terminals. End-of-life protection protects the user from a malfunction in the protective device that prevents the interruption or indication of a fault condition in the electrical distribution system. End-of-life protection circuits may include manual methods that alert the user to the end-of-life condition when the user depresses a button. Automatic end-of-life circuitry may activate an end-of-life indicator, decouple the load circuit from the line terminals, or both. If indication and power denial are both provided, the indication may precede power denial by a predetermined period. An indicator can be a flashing red indicator. The indicator, whether visual or audible, may be disposed on cover 200. Reference is made to U.S. patent application Ser. No. 10/729,396 and U.S. patent application Ser. No. 10/668,654, which are incorporated herein by reference as though fully set forth in its entirety, for a more detailed explanation of automatic end-of-life power denial and/or indication.

A portion of the circuitry and other components of device 10 may be disposed on a printed circuit board 238. Printed circuit board 238 is usually less than or equal to about 0.031 inches in thickness. Alternatively, the components may be disposed on a printed circuit membrane. On the other hand, the printed circuit board may be apertured to permit the ground blade openings 210 and compartment 216, if provided, to pass there-through. Alternatively, electronic or electro-mechanical components may be disposed on both sides of the printed circuit board to thereby conserve space. As such, electronic or electro-mechanical components that are coupled to the line terminals, or those that operate at or near the power source voltage may be disposed on one side of the printed circuit board. Those that are coupled to the power supply and that operate at typically less than 30 Volts may be disposed on the opposite side of the printed circuit board.

Figure 4:
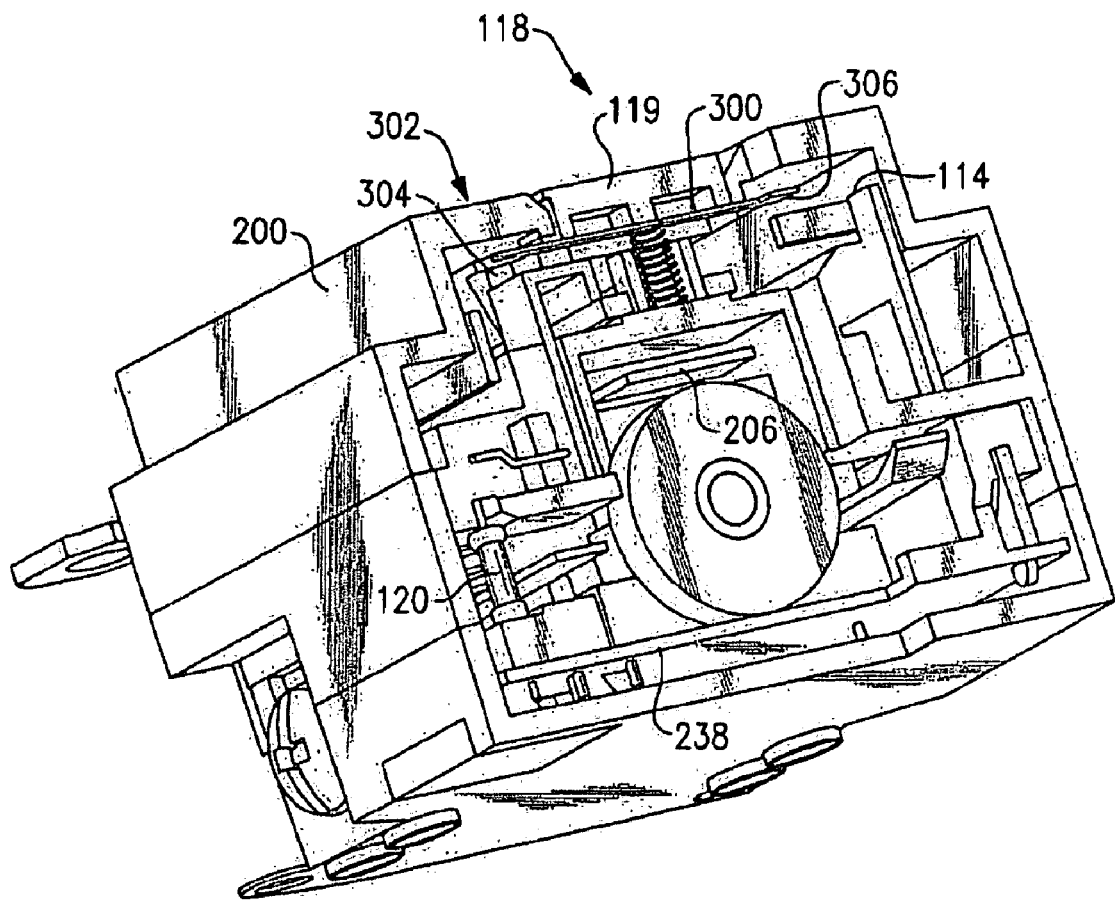
FIG. 4 is a latitudinal cross sectional view of a thin electrical wiring device in accordance with yet another embodiment of the present invention.

As embodied herein, and depicted in FIG. 4, a latitudinal cross sectional view of a thin electrical wiring device in accordance with another embodiment of the present invention is shown. This embodiment discloses an improved test switch. Test switch 118 includes a test blade 300 that is disposed above strap 206. One important feature of this embodiment is that test blade 300 is disposed above strap 206 to thereby reduce the depth behind the strap. Although test blade 300 and strap 206 are separated by an air spacing, known devices have had to include supplemental insulation to assure that the strap and test blade are electrically isolated from each other. Examples of supplemental insulation include non-conductive tape disposed around the strap or a plastic insulator interposed between the two. The need for supplemental insulation can be eliminated by a number of strategies or strategies in combination.

As noted above, one strategy is to make the distance between the strap 206 and surface 302 of cover 200 as large as possible, i.e. about 0.300 inches. A distance greater than this may interfere with the alignment of the wall plate and/or weather-proof cover required to complete the installation of device 10. FIG. 3 illustrates another feature of this embodiment. When test switch 118 is in the closed position, test blade 300 connects test circuit 120 to a load terminal 114. When test switch 118 is in the open position, approximately equal air gaps 304 and 306 break the electrical connection. The total air gap of test switch 118 (air gaps 304 plus 306) must be such that test circuit 120 is properly insulated during a voltage transient event. Test blade 300 only has to travel about half the distance to open or close the preferred air gap distance when two air gaps are used. Thus, the depth above the strap can be reduced by approximately 0.045 inches. Test blade 300 may be secured to test button 119 using snap fits (not shown).

The limited amount of space on printed circuit board 238 on which to dispose electrical or electro-mechanical components is used to best advantage if components disposed thereon are principally operated at a low voltage, e.g., less than 30 Volts. Such components may be spaced apart from one another by approximately 0.01 inches. Components operating at or near the line voltage may be required to be spaced apart by 0.04 inches.

In most related art circuits, a full wave power supply is employed. Therefore, a physical spacing must be provided between the line and load terminals, and the power supply terminals. One embodiment of the present invention eliminates this requirement by employing a half-wave power supply. A half wave power supply such as illustrated in FIG. 1. Note that the circuit ground reference is connected to the line neutral. Accordingly, the aforementioned spacing that is required by the related art is avoided, thus conserving space.

With regard to the test circuit, the test circuit components may be disposed off of circuit board 238. Only the low voltage portion of test circuit 120 may be disposed on circuit board 238, i.e., the portion extending from line neutral 218 to button 119. The test button 119 and the components that extend to load hot are not disposed on circuit board 238.

In an alternative embodiment, ancillary features may be included in device 10. The ancillary features are implemented using various components that may be disposed, or partially disposed, in the housing portion above the strap.

Figure 5:
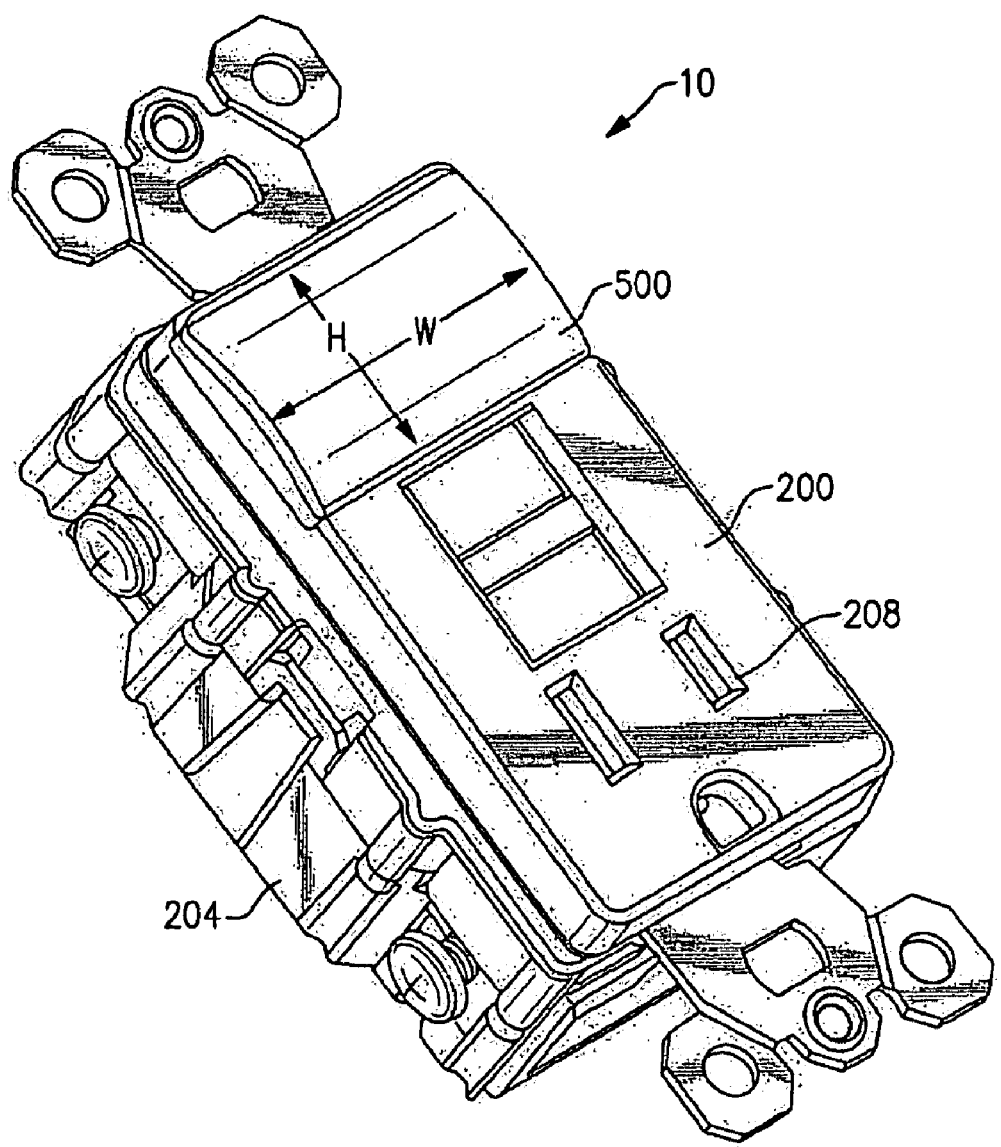
FIG. 5 is a detail view of the cover with a night light feature.

Referring to FIG. 5, a nightlight 500 is disposed in the front cover 200. The nightlight is configured to broadcast light into a darkened space. The nightlight may turn on automatically when the level of ambient light is less than a predetermined threshold. The components associated with the nightlight include a lamp assembly, ambient light sensor, and/or lens. The lens is configured to occupy a portion of front cover 200. Reference is made to U.S. Application Ser. No. 60/550,275, filed on Mar. 5, 2004, which is incorporated herein by reference as though fully set forth in its entirety, for a more detailed explanation of a nightlight disposed in a cover.

Figure 6:
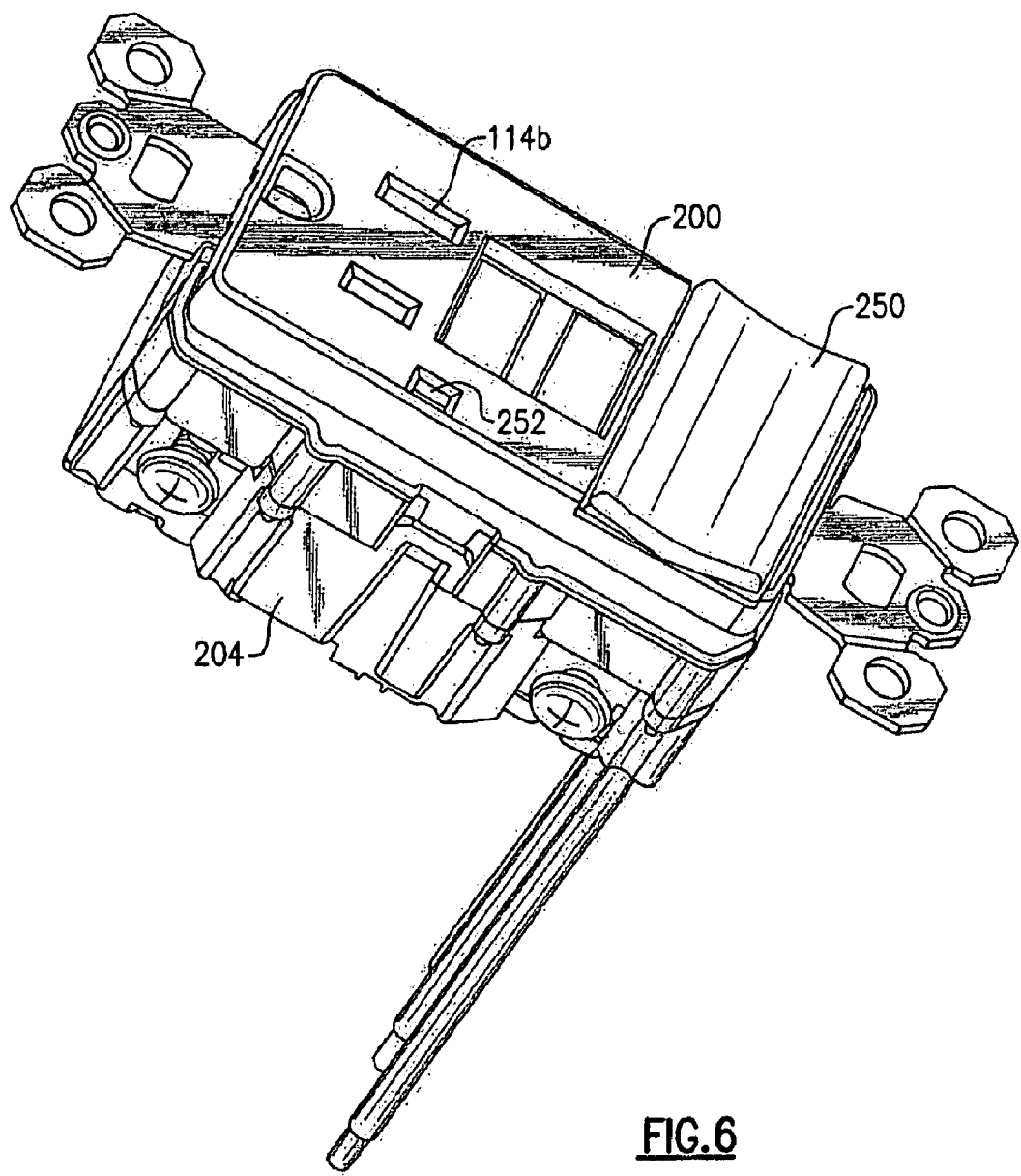
FIG. 6 is a detail view of the cover with a switch.

Referring to FIG. 6, at least one switch 250 may be disposed in the front cover 200. The at least one switch may be coupled to either the line terminals or load terminals of device 10, to thereby provide switchable power to a set of auxiliary terminals. An indicator 252 may also be disposed in cover 200. Reference is made to U.S. Application Ser. No. 60/553,795 filed on Mar. 16, 2004, which is incorporated herein by reference as though fully set forth in its entirety, for a more detailed explanation of a switch disposed in cover 200.

Other features may be accommodated by the present invention as well. For example, a membrane may be disposed behind cover 200. The membrane is configured to protect the device from stray contaminants. The membrane may be disposed between the strap 206 and surface 302. The present invention may also include a shutter mechanism that is configured to block the insertion of a plug into the plug receptacle openings when device 10 has been miswired. The shutters may also block the insertion of a metal object other than a plug into the plug receptacle to thereby prevent an electric shock. Reference is made to U.S. patent application Ser. Nos. 10/729,685 and 10/900,778, which are incorporated herein by reference as though fully set forth in its entirety, for a more detailed explanation of a device including membranes and/or shutters.

The ancillary features illustrated above may be implemented in device 10 as stand-alone features, or in combination. In certain circumstances, when a plurality of such features are employed, the depth of the front cover to the strap may be about 0.500 inches. Alternatively, the depth behind the strap may be increased to approximately 1.100 inches or less.

As embodied herein, and depicted in FIGS. 7-11, various configurations of circuit interrupter 110 in accordance with the present invention are disclosed. Referring to FIG. 4, pairs of plug receptacle terminals 114b and feed through terminals 114a have been permanently connected together electrically via unitary load terminal assemblies 400. Bus bars 402 are disposed between a line terminal 112 and a load terminal assembly 400. To those having ordinary skill in the art, bus bars 402 may be replaced by cantilever beams.

Referring to FIG. 8-11, plug receptacle terminals 114b and feed through terminals 114a may or may not be permanently joined together, depending on whether a two-pole trip mechanism or a four-pole trip mechanism is being implemented. These figures are examples of how device 10 may be configured to prevent electrical connection between one or more sets of receptacle terminals and feed through terminals when device 10 has been miswired. Power does not flow to a user attachable load connected to plug receptacles 114b when device 10 is miswired (i.e. source power has been connected to feed through terminals 114b).

Figure 8:
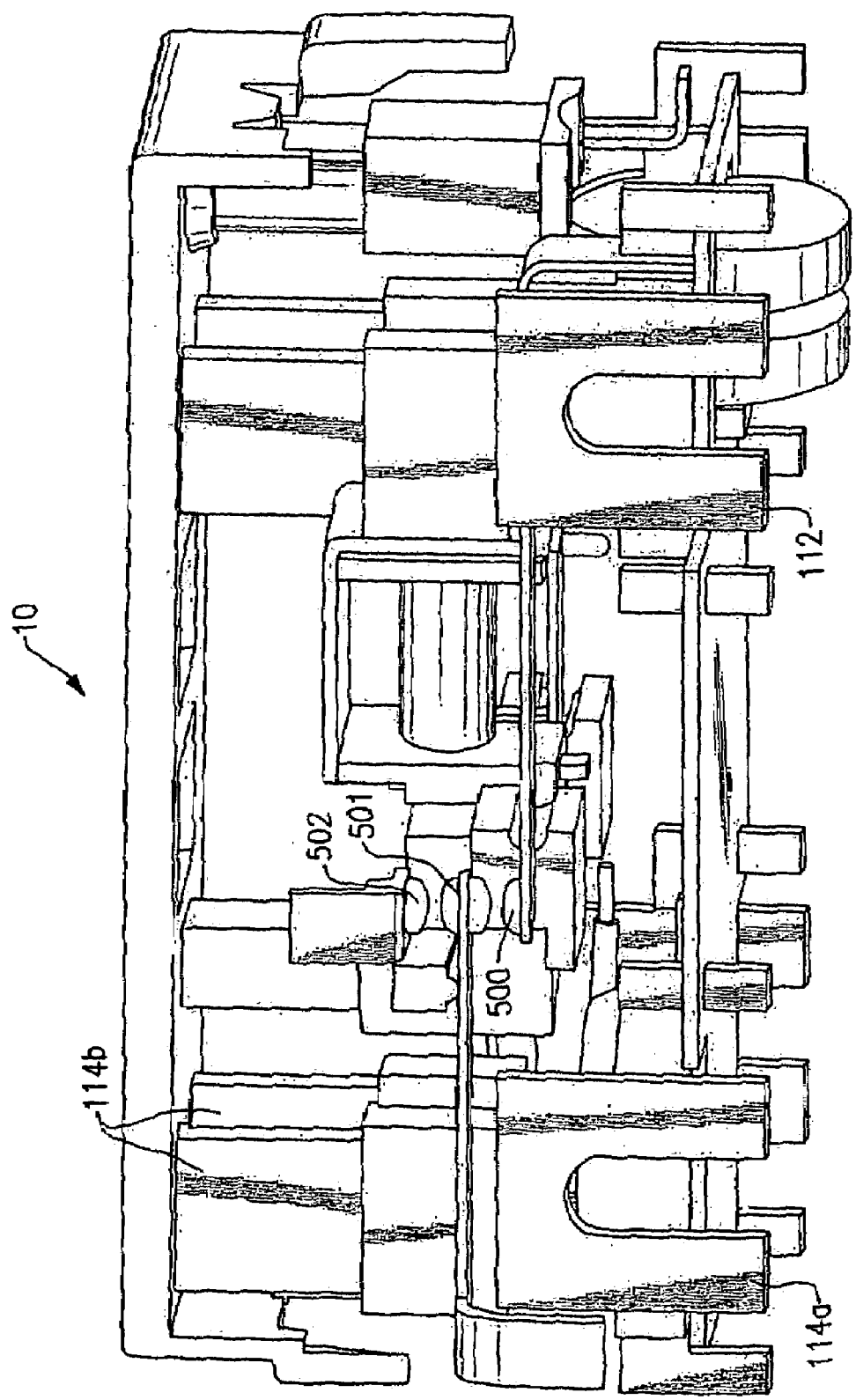
FIG. 8 is a diagrammatic depiction of a circuit interrupter in accordance with another embodiment of the present invention.

Referring to FIG. 8, circuit interrupter 110 includes at least one assembly comprising two cantilever beams 500 and 501, and a fixed contact 502. When circuit interrupter 110 is in the reset position, trip mechanism 108 urges cantilever contact 500 to make electrical contact with the sandwiched cantilever contacts 501. In response, sandwiched cantilever contacts 501 are driven towards fixed contact 502. As a result, line terminal 112, feed through terminal 114a and plug receptacle terminal 114b are electrically continuous. When circuit interrupter 110 is in the tripped position, trip mechanism 108 releases the cantilever beams 500, 501 and fixed contact 502 to electrically separate. Thus line terminal 112, feed through terminal 114a and plug receptacle terminal 114b are electrically disconnected from each other. This arrangement eliminates hazards due to device miswiring.

Figure 7:
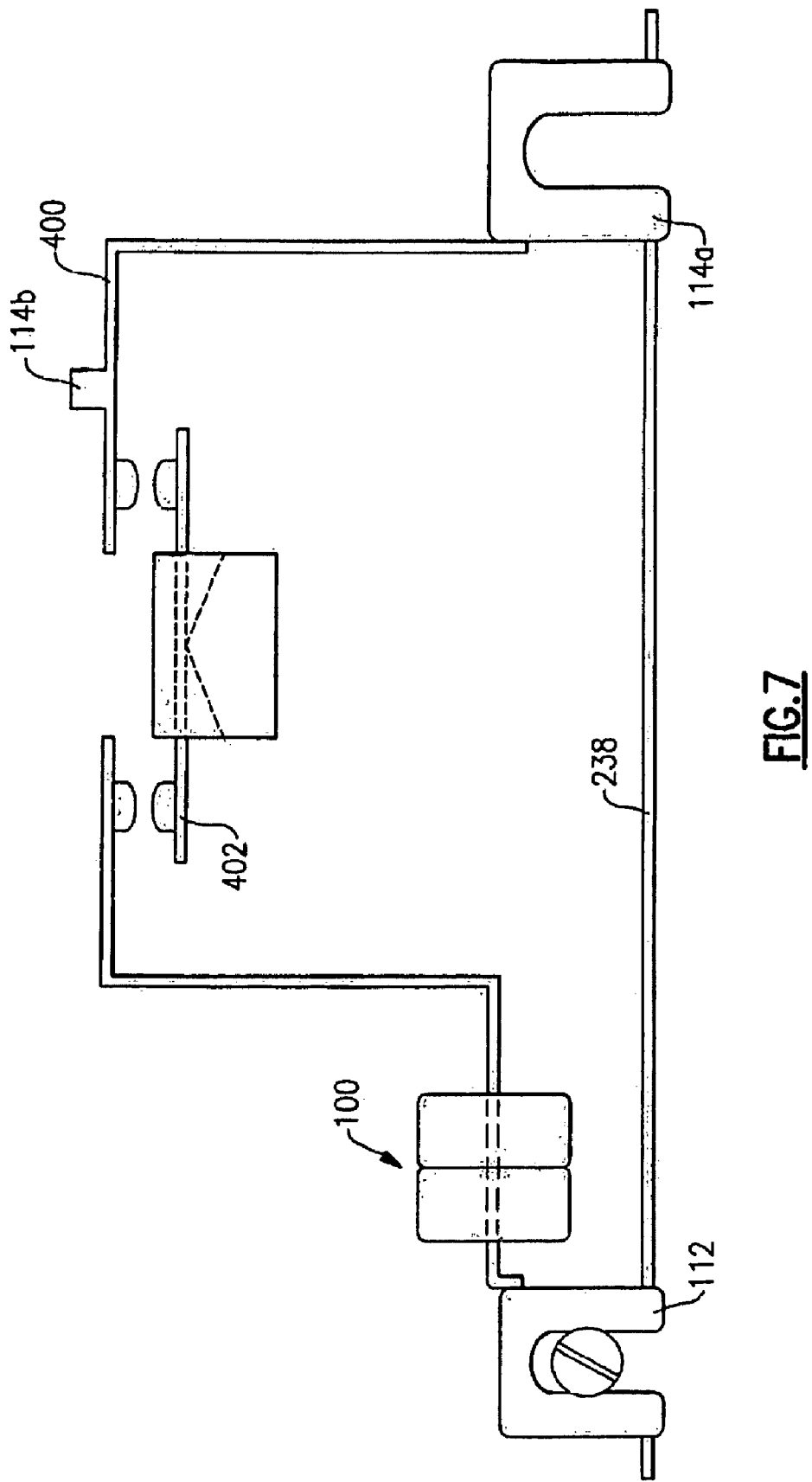
FIG. 7 is a diagrammatic depiction of a circuit interrupter in accordance with an embodiment of the present invention.
Figure 9:
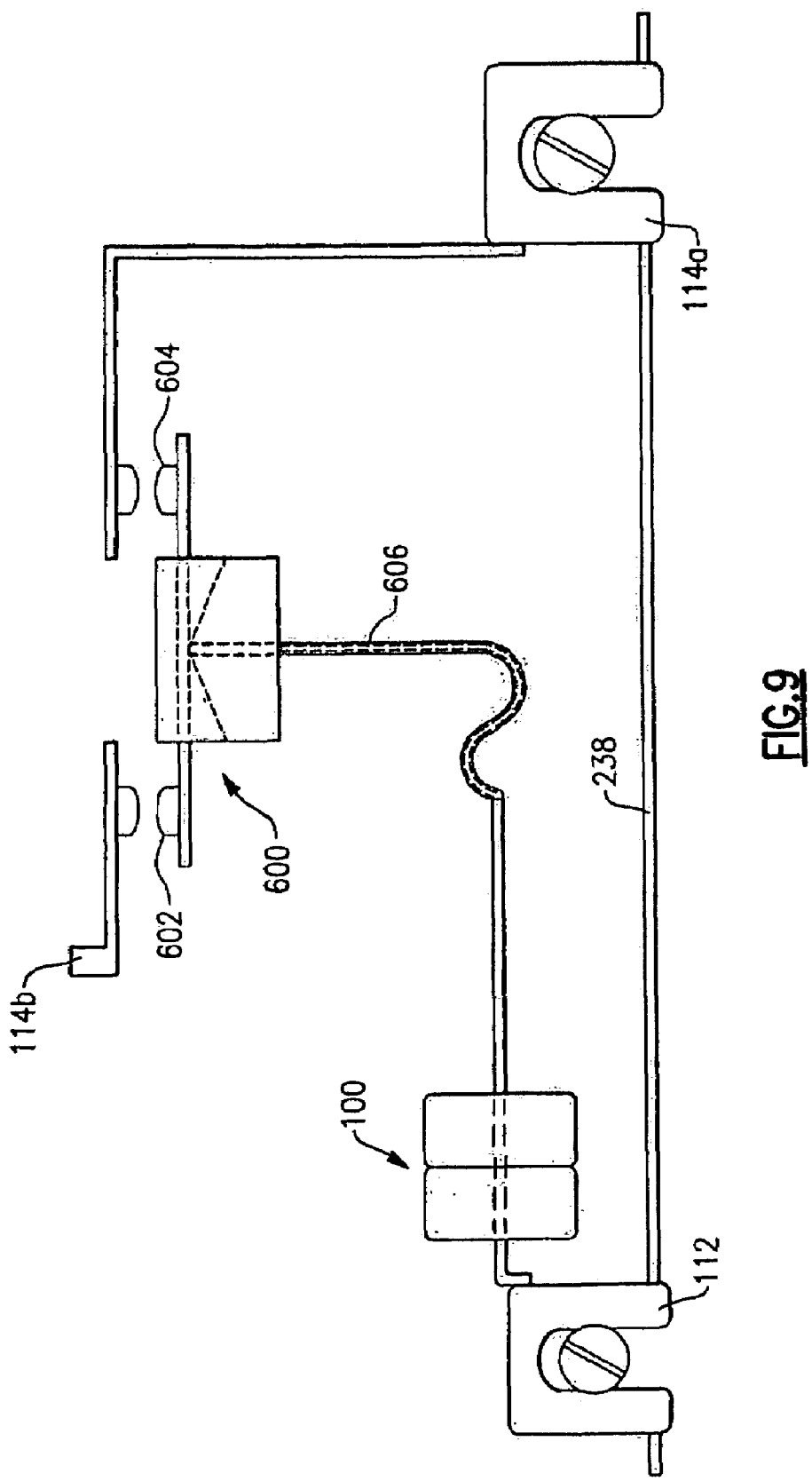
FIG. 9 is a diagrammatic depiction of a circuit interrupter in accordance with another embodiment of the present invention.

Referring to FIG. 9, a circuit interrupter 110 similar to the embodiment depicted in FIG. 7 is shown. A bus bar assembly 600 for each of the hot and neutral current paths is included. Each bus bar assembly 600 includes two contacts 602, 604 and a flexible cable 606 that flexes to allow the bus bar assembly to move from a closed (reset) position to an open (tripped) position. Contacts 602, 604 and flexible cable 606 are configured to connect to a line terminal 112, feed through terminal 114a and plug receptacle terminal 114b. When circuit interrupter 110 is reset, the bus bar assembly 600 interconnects line terminal 112, feed through terminal 114a and plug receptacle terminal 114b. When circuit interrupter 110 is tripped, the bus assembly 600 breaks electrical connectivity between line terminal 112, feed through terminal 114a and plug receptacle terminal 114b. Therefore, any potentially hazardous conditions are not present at the receptacle in the event of a miswire condition.

Figure 10:
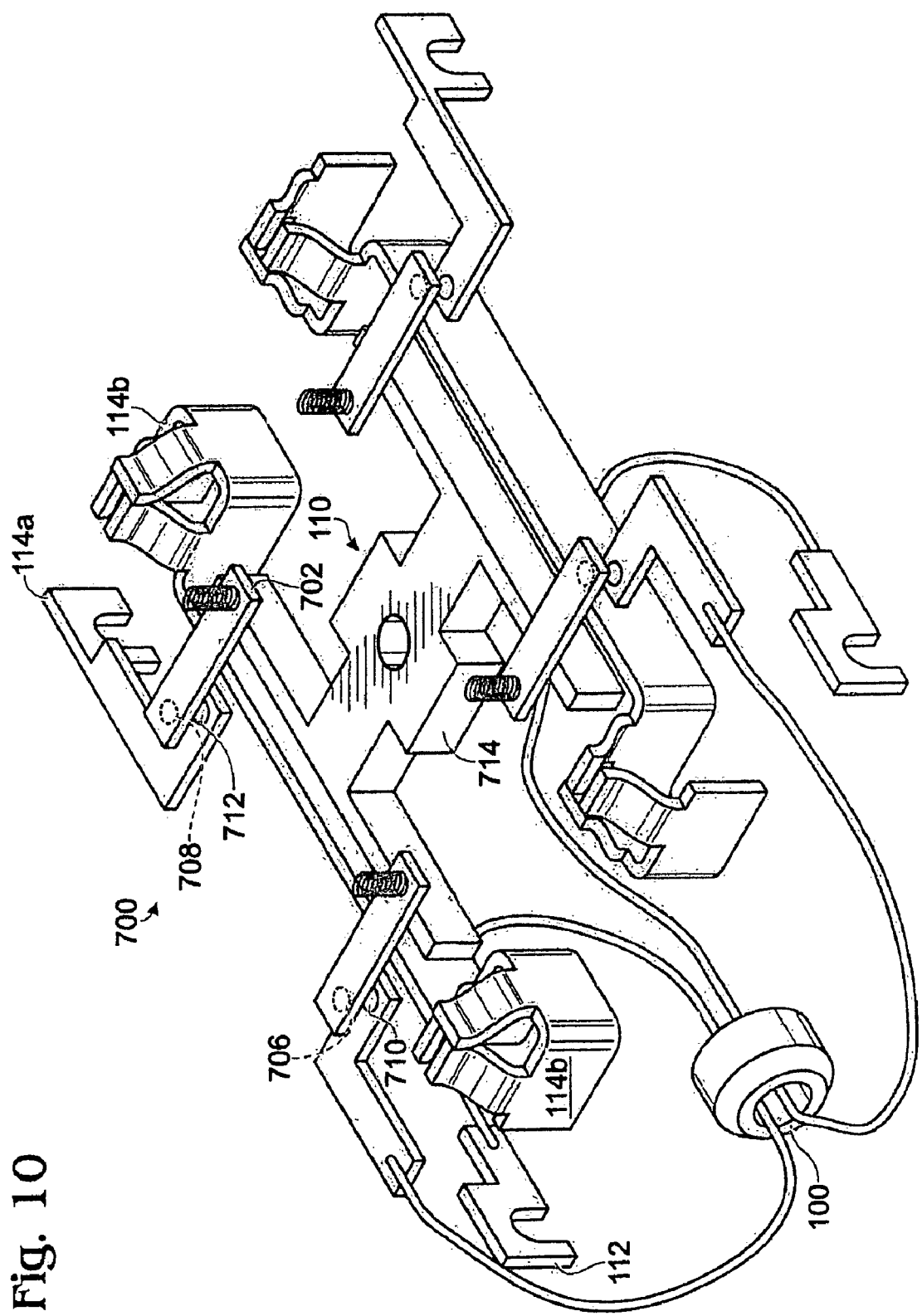
FIG. 10 is a diagrammatic depiction of a circuit interrupter in accordance with yet another embodiment of the present invention.

Referring to FIG. 10, a circuit interrupter 110 includes rocker assembly 700. Rocker assembly 700 includes pivot members 702 that are inserted into slot 703 disposed in conductive member 704. Pivots 702 rotate within slot 703 while making electrical connection with conductive member 704. Conductive surface 704 is connected to plug receptacle terminal 114b. Pivot members 702 move rotationally in response to motion of the latch block 714. Latch block 714 moves upward during a reset operation, and moves downward when the device is tripped. Contacts 706 and 708 are connected to pivot members 702. Contacts 710, 712 are respectively coupled to a line terminal 112 and a feed through terminal 114a. Latch block 714 causes pivot members 702 to connect contacts 706, 708 electrically to contacts 710, 712, when circuit interrupter 110 is in the reset condition. In other words, a line terminal 112, feed through terminal 114a and plug receptacle terminal 114b are connected together by way of pivot members 702. On the other hand, latch block 714 causes pivot members 702 to break the electrical connections when circuit interrupter 110 is in the tripped condition.

Alternatively, the rocker assembly 700 may include a unitized pivot member instead of individual members 702 (not shown.) Alternatively, at least one pivot member may be disposed to pivot against, while making electrical connection with, a conductive surface coupled to a line terminal 112 or feed through terminal 114a (not shown.) The pivot member(s) are configured to electrically connect line terminal 112, feed through terminal 114a and plug receptacle terminal 114b together when the circuit interrupter 110 is in the reset position. The pivot member(s) are configured to break the electrical connections among the line terminal 112, feed through terminal 114a and plug receptacle terminal when the circuit interrupter 110 is in the tripped position.

Figure 11:
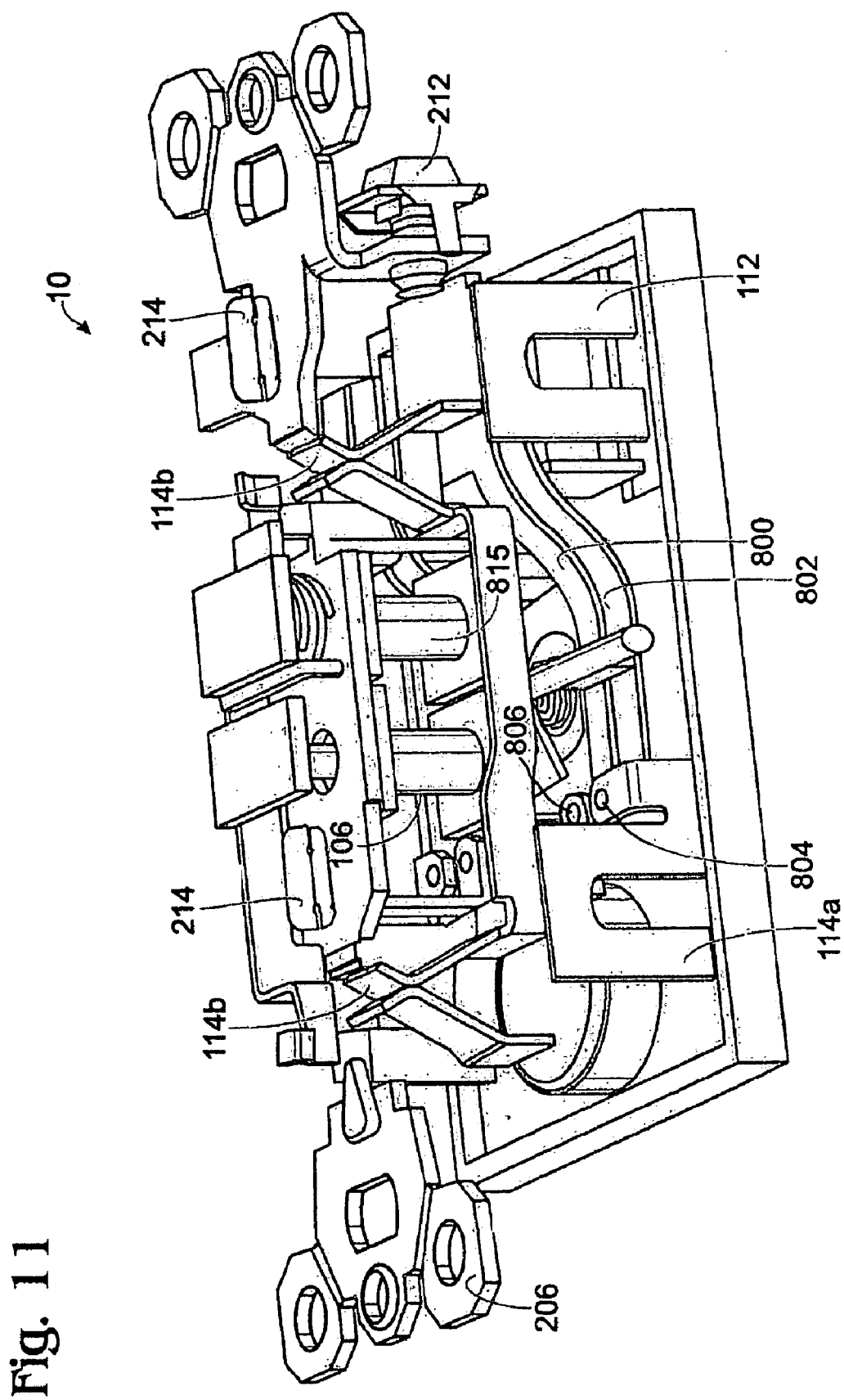
FIG. 11 is a diagrammatic depiction of a circuit interrupter in accordance with yet another embodiment of the present invention.

Referring to FIG. 11, circuit interrupter 110 includes at least one cantilever assembly including two cantilevers 800, 802, and two fixed contacts 804, 806. Cantilevers 800 and 802 are connected to a line terminal 112. Fixed contacts 804 and 806 are connected to a plug receptacle terminal 114b and feed through terminal 114a, respectively. Trip mechanism 108 includes a reset solenoid 815 that urges the cantilevers 800, 802 into electrical connectivity with fixed contacts 804, 806. As in the previous embodiments, the protective circuit assembly includes trip solenoid 106 that is configured to separate cantilevers 800, 802 from the fixed contacts 804, 806, respectively.

Figure 12:
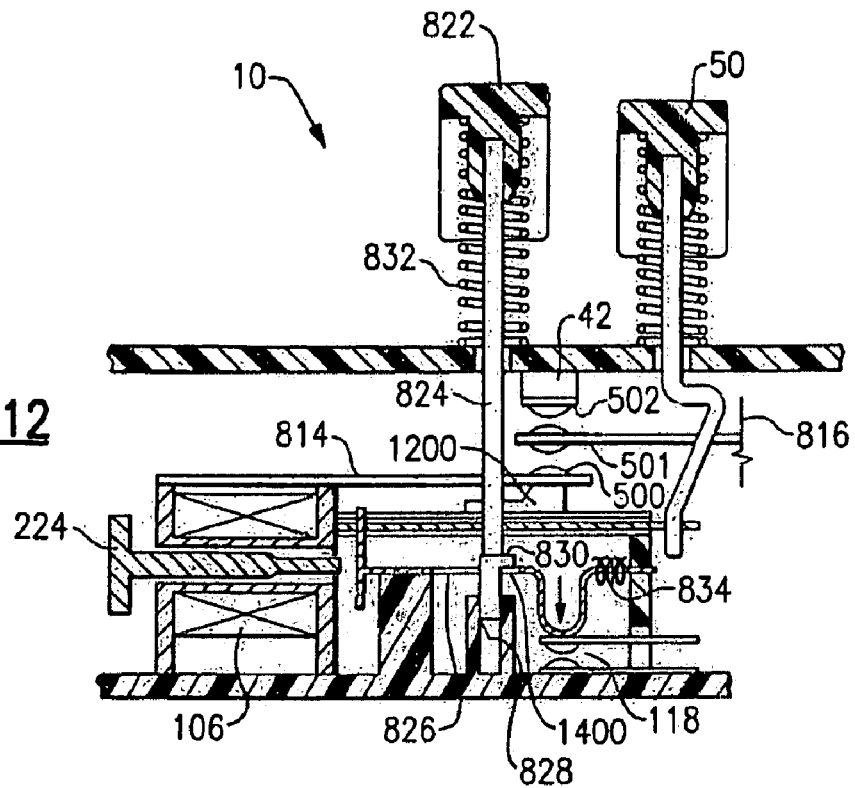
FIGS. 12-15 are detail views of a reset lock-out mechanism.

As embodied herein and depicted in FIGS. 12-15, detail views of a reset lock-out mechanism for use in the various embodiments of the invention are disclosed. Directions of movement are depicted as arrows. Referring to FIG. 12, device 10 is in the tripped condition, i.e., latch 826 is not coupled to escapement 830. In order to accomplish reset, a downward force is applied to reset button 822. Shoulder 1400 on reset pin 824 bears downward on electrical test switch 118 to enable a test signal. The test signal simulates a fault condition in the electrical distribution system such as a ground fault condition or an arc fault condition.

Figure 13:
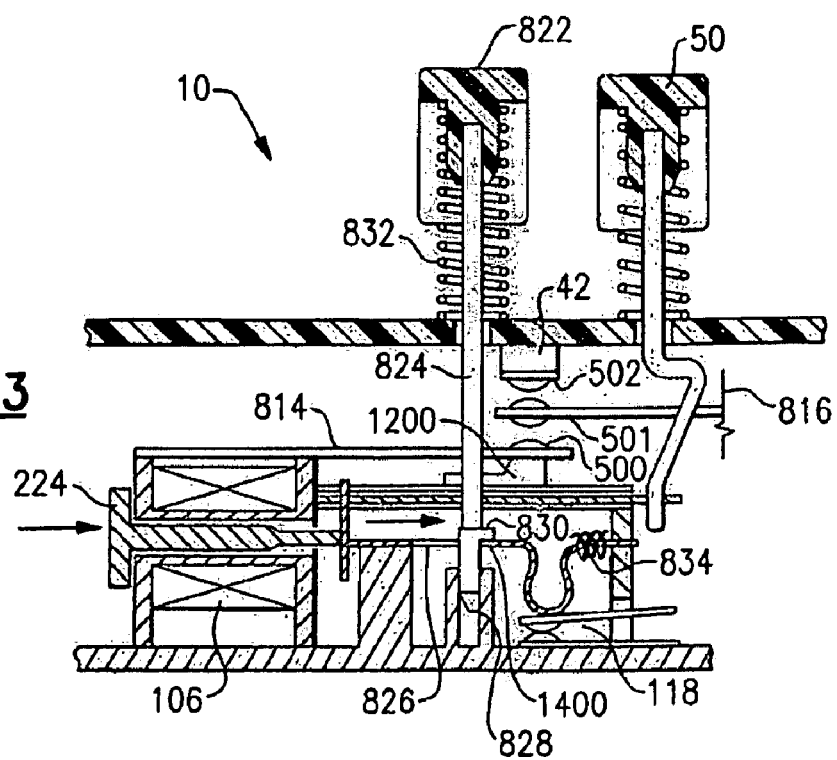

Referring to FIG. 13, the test signal is sensed and detected by detector 102. The detector provides a signal that causes solenoid 106 to activate armature 224. Armature 224 moves in the direction shown, permitting hole 828 in latch 826 to become aligned with shoulder 1400. The downward force applied to reset button 822 causes shoulder 1400 to continue to move downward, since it is no longer restrained by shoulder 1400. Since shoulder 1400 is disposed beneath latch 826, it is no longer able to apply a downward force on latch 826 to close electrical switch 118. Accordingly, switch 118 opens to thereby terminate the activation of solenoid 52. Armature 224 moves in the direction shown in response to the biasing force of spring 834.

Figure 14:
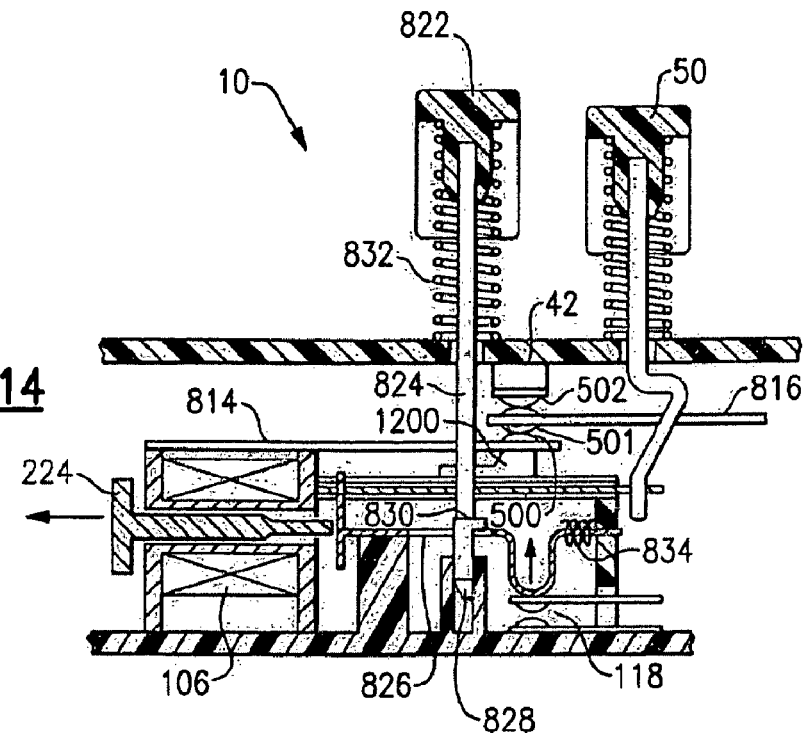

As depicted in FIG. 14, the trip mechanism is in a reset condition. In other words, any the downward force on reset button 822, as described above, is no longer present. Accordingly, latch 826 is seated on latching escapement 830.

Figure 15:
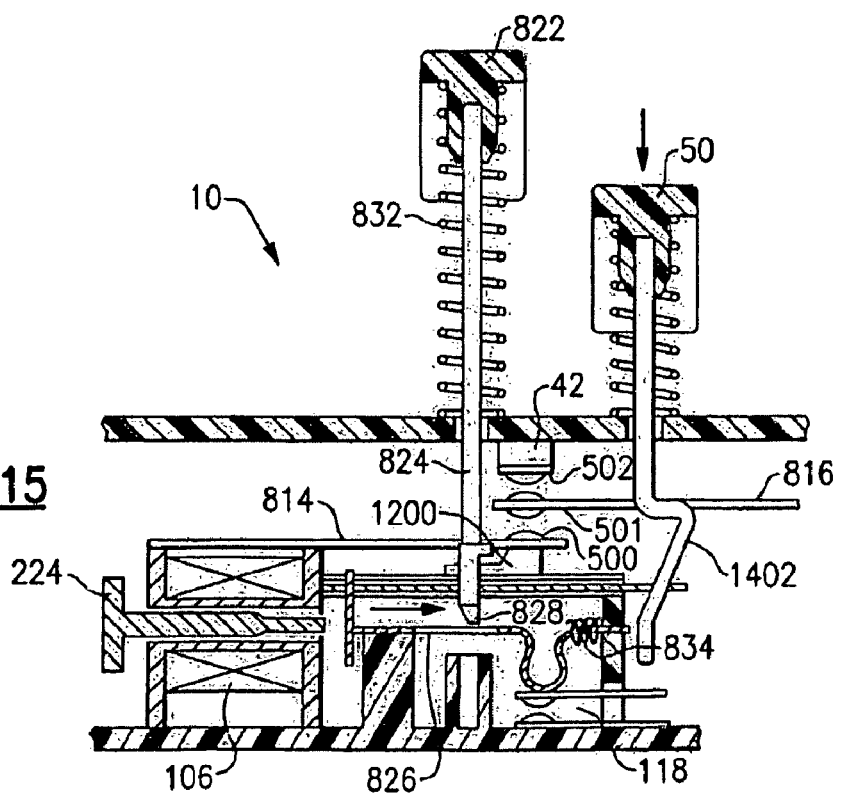

Referring to FIG. 15, a user accessible test button 50 is coupled to the trip mechanism. When test button 50 in FIG. 15 is depressed, device 10 is tripped by a mechanical linkage. In particular, when force is applied to test button 50, a mechanical linkage 1402 urges latch 826 in the direction shown. Latch 826 opposes the biasing force of spring 834. In response, hole 828 in latch 826 becomes aligned with escapement 830. The trip mechanism is tripped because latch 826 is no longer restrained by escapement 830.

As has been described, the device resets as a consequence of solenoid 106 activating armature 224. However, if the protective device 10 has reached an end-of-life condition, armature 224 is not activated. Therefore, the mechanical barrier is not removed and the mechanical barrier (shoulder) prevents the trip mechanism from resetting. The physical barrier prevents the protective device from being resettable if there is an end-of-life condition.

Figure 16:
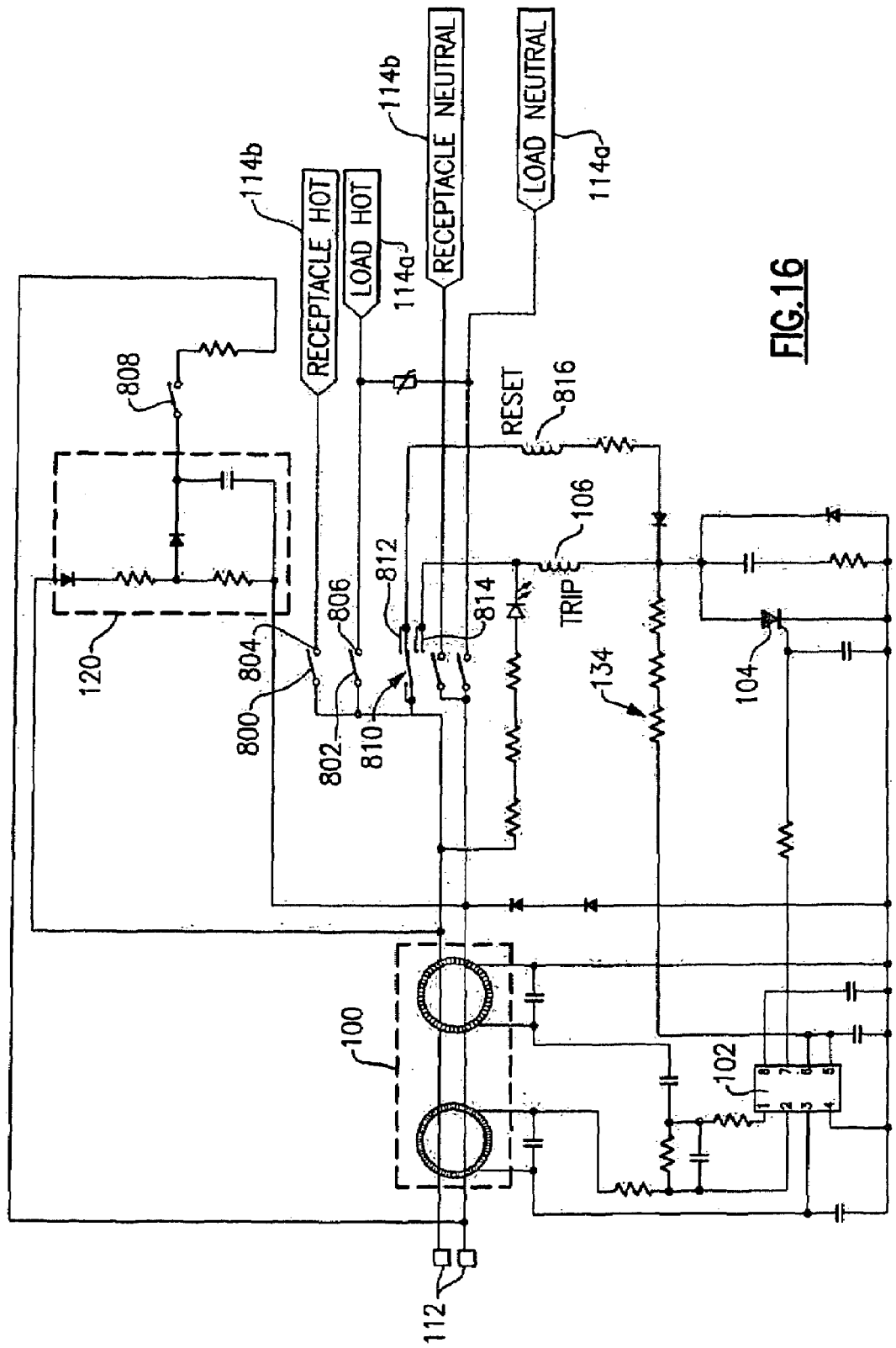
FIG. 16 is a schematic diagram in accordance with an alternate embodiment is depicted.

Referring to FIG. 16, a schematic diagram in accordance with an alternate embodiment is depicted. The embodiment of FIG. 9 is similar to the embodiment shown in FIG. 11. However, while separate test and reset buttons can be employed, the schematic in FIG. 16 illustrates how a single button 808 may combine the functions of test button 119 and reset button 116. For the sake of discussion, it is assumed that the interrupting contacts are initially in the reset position and switch mechanism 810 is in position 814. Accordingly, when single button 808 is depressed, test circuit 120 is configured to produce a test signal for a predetermined period of time. The test signal simulates a fault condition that is sensed by sensor 100 and detected by detector 102. SCR 104 turns ON, causing solenoid 106 to activate. Trip mechanism 108 causes the circuit interrupter 110 to trip, whereby cantilevers 800 and 802 move to the open (tripped) position, and switch mechanism 810 moves to position 812. If single button 808 is subsequently depressed in the tripped state, test circuit 120 produces another test signal. If device 10 is operative and switch mechanism 810 is in position 812, reset solenoid 816 activates to move circuit interrupter 110 to the closed (reset) position. Thus, a single test button may be employed to provide electrical signals for tripping and resetting a circuit interrupter. The use of a single button is yet another strategy for efficiently using space within device 10.

Accordingly, the combination of the test and reset buttons into a single button is another miniaturization strategy employed by the present invention. When the button is depressed, the protective device is tested, the circuit interrupter is tripped, and the protective device is reset. Resetting the protective device may be contingent on the protective device being operative (able to sense, detect, and interrupt a fault condition). As shown in FIG. 16, a single button 232 may be disposed within cover 200. When depressed, button 232 activates a mechanical linkage that is configured to apply force to the trip mechanism 108. Trip mechanism 108 opens circuit interrupter 110. When single button 232 is depressed further, test switch 118 is closed (FIG. 1). If device 10 is operative, solenoid 106 is activated. A mechanical barrier may be configured to prevent reset unless solenoid 106 has in fact activated.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A protective wiring device comprising:
a housing including a front cover member having a front major surface and a back cover member having a back major surface substantially in parallel with the front major surface, the housing further including an electrically isolating member disposed between the front cover member and the back cover member such that a front interior region is formed between the front cover member and the electrically isolating member and a rear interior region is formed between the back cover member and the electrically isolating member;
a ground strap having an interior ground strap portion disposed on the electrically isolating member in the front interior region;
a plurality of line terminals configured to be connected to an AC power source and a plurality of load terminals, the plurality of line terminals including a hot line contact and a neutral line contact and the plurality of load terminals including a hot load contact and a neutral load contact, the hot line contact and the neutral line contact being configured to be coupled to the hot load contact and the neutral load contact, respectively, in a reset state and decoupled in a tripped state;

a user accessible reset button assembly disposed in the front cover and configured to effect the reset state in response to a user stimulus, the user accessible reset button assembly establishing a plane normal to the major front surface and subdividing the rear interior region into a first rear interior region portion and a second rear interior region portion; and a protective electrical assembly substantially disposed in the rear interior region, the protective electrical assembly including a toroidal sensor assembly disposed in the first rear interior region portion and coupled to the plurality of line terminals, the toroidal sensor assembly being coupled to a fault detection circuit, the fault detection circuit being coupled to a solenoid assembly disposed proximate the toroidal sensor assembly and disposed in the first rear interior region portion such that a vertical distance between the interior ground strap portion and the back major surface is less than or equal to approximately one inch.

2. The device of claim 1, wherein the protective electrical assembly includes a hot cantilevered circuit interrupter structure interconnecting the hot line contact and the hot load contact in the reset state and a neutral cantilevered circuit interrupter structure interconnecting a neutral line contact and a neutral load contact in the reset state, at least one of the hot cantilevered circuit interrupter structure and the neutral cantilevered circuit interrupter structure being configured to be driven into the tripped state in response to the solenoid being energized by the fault detection circuit.

3. The device of claim 2, wherein the hot cantilevered circuit interrupter structure and the neutral cantilevered circuit interrupter structure are disposed in the rear interior region adjacent the solenoid.

4. The device of claim 2, wherein the hot cantilevered circuit interrupter structure and the neutral cantilevered circuit interrupter structure comprise a four-pole circuit interrupter.

5. The device of claim 2, wherein the front interior region includes a hot receptacle terminal structure having a hot receptacle terminal contact that is coupled to the hot line contact and the hot load contact in the reset state, and a neutral receptacle terminal structure includes a neutral receptacle terminal contact that is coupled to the neutral line contact and the neutral load contact in the reset state.

6. The device of claim 5, wherein the hot load contact, the hot receptacle contact and the hot line contact are disposed in substantial vertical alignment, and wherein the neutral load contact, the neutral receptacle contact and the neutral line contact are disposed in substantial vertical alignment.

7. The device of claim 2, wherein the hot cantilevered circuit interrupter structure and the neutral cantilevered circuit interrupter structure are disposed in the rear interior region on either side of the solenoid.

8. The device of claim 2, wherein the hot cantilevered circuit interrupter structure is coupled to the hot line terminal via the toroidal sensor assembly in the first rear interior region portion and coupled to the hot load terminal in the second rear interior region portion, and wherein the neutral cantilevered circuit interrupter structure is coupled to the neutral line terminal via the toroidal sensor assembly in the first rear interior region portion and coupled to the neutral load terminal in the second rear interior region portion.

9. The device of claim 1, wherein the protective electrical assembly is substantially mounted on a printed circuit board (PCB), at least one electronic component of the fault detection circuit being disposed on an underside of the PCB adjacent the back cover.

10. The device of claim 1, wherein the protective electrical assembly includes a circuit interrupter coupled to the solenoid and the fault detection circuit, the circuit interrupter including four sets of contacts.

11. The device of claim 10, wherein the four sets of contacts are disposed on a plurality of bus bars.

12. The device of claim 11, wherein the plurality of bus bars include a hot bus-bar connected to a hot line terminal of the plurality of line terminals and a neutral bus bar connected to a neutral line terminal of the plurality of line terminals.

13. The device of claim 1, wherein the solenoid assembly includes a plurality of solenoid windings.

14. The device of claim 13, wherein the plurality of solenoid windings includes a trip solenoid and a reset solenoid.

15. The device of claim 1, wherein the front interior region includes a hot receptacle terminal structure having a female hot receptacle contact and a hot terminal contact coupled to the hot line contact and the hot load contact in the reset state, and a neutral receptacle terminal structure having a female neutral receptacle contact and a neutral terminal contact coupled to the neutral line contact and the neutral load contact in the reset state, the female hot receptacle contact and the female neutral receptacle contact being in communication with a set of receptacle openings formed in a first end of the front cover.

16. The device of claim 15, wherein the second end of the front cover includes a user-accessible electrical interface coupled to an electrical device substantially disposed in the second rear interior region portion.

17. The device of claim 16, wherein the user-accessible electrical interface is a switch paddle and the electrical device is an electrical switch.

18. The device of claim 16, wherein the user-accessible electrical interface is a lens and the electrical device is an electrical light.

19. The device of claim 1, wherein the protective electrical assembly includes an energy-efficient power supply that is configured to provide power to the protective electrical assembly during all or a portion of a predetermined half cycle of a plurality of AC cycles.

20. The device of claim 1, further comprising a test button assembly disposed adjacent to the reset button assembly in the front cover, the test button being coupled to at least one test circuit coupled to the protective electrical assembly.

21. The device of claim 20, wherein the test button assembly includes a test blade having a dual air-gap between the test circuit.

22. The device of claim 1, further comprising a test circuit that includes an automated self-test circuit configured to periodically test the protective electrical assembly.

23. The device of claim 22, wherein the automated self-test circuit is configured to introduce a simulated fault during a predetermined half-cycle of an AC cycle.

24. The device of claim 23, wherein the predetermined half-cycle of an AC cycle is a negative half cycle of the AC cycle.

25. The device of claim 22, wherein the automated self-test circuit is configured to substantially prevent the device from operating in the reset state in response to a test failure representative of an end-of-life condition.

26. The device of claim 1, wherein the fault detection circuit includes a wiring state detection circuit configured to determine whether a source of AC power is coupled to the plurality of line terminals or the plurality of load terminals.

27. The device of claim 1, wherein the ground strap includes a first mounting portion connected to the interior ground strap portion at a first end thereof and a second mounting portion connected to the interior ground strap portion at a second end thereof, the first mounting portion and the second mounting portion being substantially co-planar and disposed in a plane less than or equal to one inch from the rear major surface.

28. The device of claim 1, wherein the front interior region includes a hot receptacle terminal structure and a neutral receptacle terminal structure forming at least one set of receptacle contacts operably aligned with at least one set of receptacle openings formed in the front cover member, the front cover member further including at least one shutter member disposed between the at least one set of receptacle contacts and the at least one set of receptacle openings.

29. The device of claim 28, wherein the fault detection circuit includes a wiring state detection circuit configured to determine whether a source of AC power is coupled to the plurality of line terminals or the plurality of load terminals, the wiring state detection circuit being configured to lock the at least one shutter member in a closed state if the plurality of line terminals and the plurality of load terminals are reverse wired.

30. The device of claim 1, wherein the electrically isolating member includes a central portion substantially parallel to the front major surface and substantially abuts an upper portion of the solenoid assembly, and wherein the electrically isolating member further includes a first electrically insulated compartment formed in a portion thereof, the first electrically insulated compartment extending into the first rear interior region portion and configured to accommodate a ground prong from an electrical plug connector inserted via the front cover member, the first electrically insulated compartment including a first compartment side-wall portion that is substantially adjacent a side portion of the toroidal sensor assembly.

31. The device of claim 30, wherein the electrically isolating member includes a second electrically insulated compartment formed in a portion thereof, the second electrically insulated compartment extending into the second rear interior region portion and configured to accommodate a ground prong from an electrical plug connector inserted via the front cover member, the second electrically insulated compartment including a second compartment side-wall portion that is substantially adjacent a portion of the reset button assembly.

32. A wiring device for use in an electrical distribution system, the device being characterized by a central longitudinal axis defining a length of the device, a central latitudinal axis defining a width of the device, and a central vertical axis defining a thickness of the device, each of the central longitudinal axis, the central latitudinal axis and the central vertical axis being disposed orthogonally relative to the other axes and substantially defining a device center, the device comprising:

a housing including a front cover having a front major surface and back cover having a rear major surface substantially parallel to the front major surface, the front cover having at least one set of receptacle openings disposed therein, the back cover including a back cover interior region having a first interior portion substantially disposed on a first side of the central latitudinal axis and a second interior portion substantially disposed on a second side of the central latitudinal axis;

a plurality of line terminals configured to be connected to an AC power source and a plurality of load terminals, the plurality of line terminals being accessible via the back cover;

a ground strap disposed on an electrically isolating member situated between the front cover and the back cover, the ground strap including an interior ground strap portion disposed in parallel with the central longitudinal axis, a vertical distance between the interior ground strap portion and the back major surface being less than or equal to approximately one inch;

a hot receptacle terminal structure including at least one hot female receptacle contact and a hot receptacle terminal contact and a neutral receptacle terminal structure including at least one neutral female receptacle contact and a neutral receptacle terminal contact, the hot receptacle terminal structure and the neutral receptacle terminal structure being disposed on the electrically isolating member; and a protective electrical assembly substantially disposed in the back cover interior region, the protective electrical assembly including, a sensor assembly coupled to the plurality of line terminals and disposed in the first interior portion, the sensor assembly being characterized by a longitudinal sensor axis arranged substantially in parallel with the central longitudinal axis, the sensor assembly being configured to provide a sensing signal corresponding to AC current propagating in the electrical distribution system, a fault detection circuit coupled to the sensor assembly, the fault detection circuit being configured to generate a fault detection signal based on the sensing signal, a solenoid assembly disposed proximate the sensor assembly in the first interior portion and coupled to the fault detection circuit, the solenoid assembly being characterized by a longitudinal solenoid axis arranged substantially in parallel with the central longitudinal sensor axis, the solenoid being energized in response to the fault detection signal, and a circuit interrupter being configured to couple a line hot contact, a load hot contact and the hot receptacle terminal contact, and couple a neutral line contact, a neutral load contact and the receptacle neutral terminal contact in a reset state such that the plurality of line terminals are coupled to the plurality of load terminals, and trip in response to the solenoid assembly being energized such that the plurality of line terminals and at least a portion of the plurality of load terminals are decoupled in a tripped state.

33. A protective wiring device characterized by a central longitudinal axis defining a length of the device, a central latitudinal axis defining a width of the device, and a central vertical axis defining a thickness of the device, each of the central longitudinal axis, the central latitudinal axis and the central vertical axis being disposed orthogonally relative to the other axes and substantially defining a device center, the device comprising:

a back cover member including an back cover interior region and an exterior major back surface, the back cover interior region including a first interior half-portion substantially disposed on a first side of the central latitudinal axis and a second interior half-portion substantially disposed on a second side of the central latitudinal axis, the back cover interior region further including a hot longitudinal interior portion disposed on a first side of the central longitudinal axis and a neutral longitudinal interior portion disposed on a second side of the central longitudinal axis;

a plurality of line terminals disposed in the first interior half-portion and configured to be connected to an AC power source, a plurality of load terminals disposed in the second interior half-portion, the plurality of line terminals being connected to their respective plurality of load terminals in a reset state and disconnected in a tripped state;

a protective electrical assembly substantially disposed in the back cover interior region, the protective electrical assembly including a toroidal sensor assembly disposed in the first interior half-portion and coupled to the plurality of line terminals, the toroidal sensor assembly being characterized by a longitudinal toroid axis arranged substantially in parallel with the central longitudinal axis, the toroidal sensor assembly being coupled to a fault detection circuit, the fault detection circuit being coupled to a solenoid assembly disposed proximate the toroidal sensor assembly in the first interior half-portion, the solenoid assembly being characterized by a longitudinal solenoid axis arranged substantially in parallel with the longitudinal toroid axis but vertically offset therefrom, the solenoid assembly being coupled to a hot cantilevered circuit interrupter structure disposed in the hot longitudinal interior portion adjacent the solenoid assembly and a neutral cantilevered circuit interrupter structure disposed in the neutral longitudinal interior portion adjacent the solenoid assembly, the hot cantilevered circuit interrupter structure and the neutral cantilevered circuit interrupter structure being configured to move between the reset state and the tripped state;

a non-conductive separator coupled to the back cover member, the non-conductive separator substantially enclosing the protective electrical assembly within the back cover member, the non-conductive separator including a central portion abutting an upper portion of the solenoid assembly, the non-conductive separator further including a first electrically insulated compartment formed in a portion thereof, the first electrically insulated compartment extending into the first interior half-portion such that a first compartment sidewall is substantially adjacent a side portion of the toroidal sensor assembly and configured to accommodate a ground prong from an electrical plug connector;

a ground strap disposed in the central portion of the separator, a vertical distance between a central portion of the ground strap and the back major surface being less than or equal to approximately one inch; and a front cover assembly coupled to the separator and substantially enclosing the central portion of the ground strap therein, the front cover assembly including a front cover having at least one plug receptacle disposed therein, the at least one plug receptacle including a first ground prong opening in spatial communication with the first electrically insulated compartment.

\* \* \* \* \*